United States Patent [19]

Takatani et al.

[11] Patent Number: 5,011,457

[45] Date of Patent: Apr. 30, 1991

[54] COIN STACKING APPARATUS

[75] Inventors: Ichiro Takatani, Hyogo; Nobuyuki Nakatani, Himeji; Shigeru Minami, Hyogo, all of Japan

[73] Assignee: Glory Kogyo Kabushiki Kaisha, Hyogo, Japan

[21] Appl. No.: 403,474

[22] Filed: Sep. 5, 1989

Related U.S. Application Data

[63] Continuation-in-part of Ser. No. 138,889, Dec. 28, 1987, Pat. No. 4,869,029.

[30] Foreign Application Priority Data

Dec. 26, 1986 [JP] Japan ................................ 61-308244

[51] Int. Cl.[5] ......................... G07D 9/06; B65G 57/30

[52] U.S. Cl. ......................................... 453/61; 53/212; 414/795

[58] Field of Search ........................ 453/31, 59, 61, 62; 53/212, 254; 414/794.9, 795

[56] References Cited

U.S. PATENT DOCUMENTS

| | | | |
|---|---|---|---|
| 1,260,382 | 3/1918 | Hosking | 453/61 |
| 1,278,349 | 9/1918 | Hosking | 453/61 |
| 1,627,791 | 5/1927 | Macy | 414/795 X |
| 2,749,120 | 6/1956 | Mallory | 414/794.9 |
| 2,772,792 | 12/1956 | Lakso | 453/31 X |
| 3,246,773 | 4/1966 | Hodgkins | 414/795 |
| 3,743,118 | 7/1973 | Fluck | 414/794.9 X |

FOREIGN PATENT DOCUMENTS

| | | | |
|---|---|---|---|
| 2610780 | 9/1977 | Fed. Rep. of Germany | 453/61 |

*Primary Examiner*—F. J. Bartuska
*Attorney, Agent, or Firm*—Beveridge, DeGrandi & Weilacher

[57] ABSTRACT

An improved coin stacking apparatus is shown which builds the stack by placing each successive coin at the bottom of the stack made of the preceding coins. This makes the device more compact in the vertical direction. The coins are stacked by a movable wheel or belt which has a coin engagement device that engages the leading edge of the coin. The wheel or belt further includes a coin displacement device which vertically displaces the stack to allow the succeeding coins to slide beneath the stack.

9 Claims, 27 Drawing Sheets

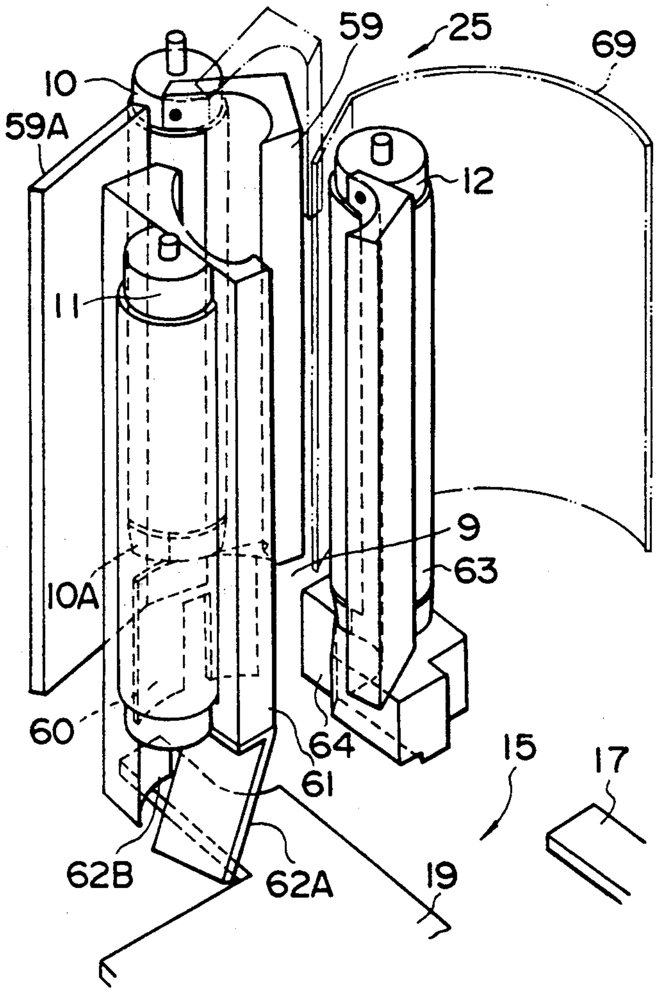
FIG. 7
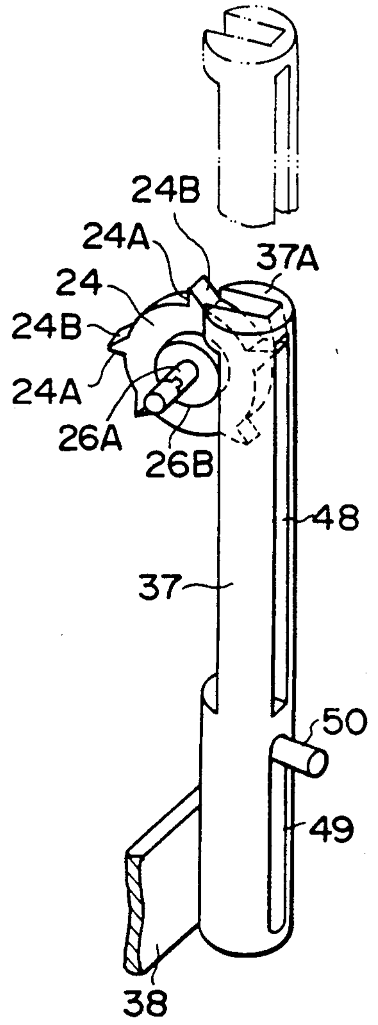
FIG. 6
FIG. 8
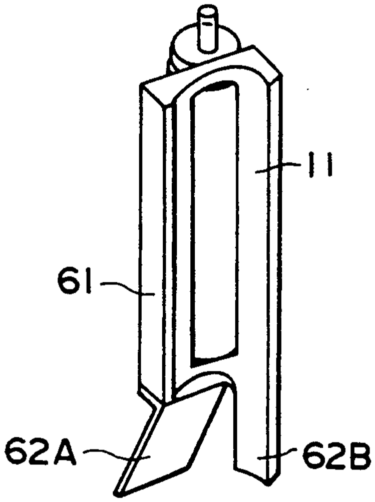

COIN STACKING APPARATUS

This Application is a continuation-in-part of U.S. Pat. Application Ser. No. 138,889, filed Dec. 28, 1987, now U.S. Pat. No. 4,869,029, which is herein incorporated by reference in its entirety.

BACKGROUND OF THE INVENTION

This invention relates to an apparatus for stacking each unit number of coins. More specifically, the invention pertains to such a coin stacking apparatus having a linear coin guideway along which the coins are fed in a horizontal row to a stacking station, wherein the coins are reliably stacked by a movable means which includes a plurality of coin engagement means and a plurality of coin displacement means.

In prior art coin stacking and wrapping apparatus, as heretofore constructed, the horizontal coin guideway along which coins are fed in a row has had its exit end disposed over an upstanding, open-top stacking tube having an openable bottom. Successively falling by gravity from the exit end of the coin guideway into the stacking tube, the coins are stacked within the latter. The bottom of the stacking tube is opened upon stacking of a prescribed number of coins, and the stack of coins is carried down to an underlying wrapping station, at which the stack is wrapped in a piece of wrapper strip.

An objection to the foregoing prior art construction is that the coins are stacked under the plane of the horizontal coin guideway and are wrapped at the wrapping station further underlying the stacking station. The wrapped stacks of coins, moreover, are ejected into a removable box still further underlying the wrapping station. This conventional arrangement has made the vertical dimension of the machine inordinately great, and even more so because the coins to be stacked and wrapped must be fed into the machine through a hopper which, of necessity, is positioned above the plane of the coin passageway.

Such a tall machine could only be mounted directly on the floor, rather than on a desk or other elevated base, as the hopper must be at such a height as to permit the easy charging of coins into the machine. However, with the machine floor-mounted, the vertical position of the box into which the wrapped stacks of coins are ejected comes very close to the floor. The operator has had to bend himself down to reach and raise the box heavily loaded with the wrapped coins, at the risk of ruining his back.

In order to remedy this weakness a suggestion has been made to incorporate into the machine an additional conveyor for transporting the wrapped stacks of coins up into a box located at a convenient height on the machine. The provision of the additional conveyor is objectionable because it adds substantially to both the bulk and the manufacturing cost of the machine. Obviously, the only truly satisfactory solution to this problem is to drastically reduce the height of the machine, without in any way adding to its bulk, complexity or manufacturing cost in so doing.

Another problem with the prior art is the considerable distance the stack of coins must travel from the stacking to the wrapping station. Because the coins are stacked within the upstanding tube and then withdrawn therefrom for transportation to the wrapping station in accordance with the prior art, the coin stack must travel a distance at least equal to its height. The longer the distance that the unwrapped coin stack travels, the greater the danger of its collapse on the way.

SUMMARY OF THE INVENTION

The present invention succeeds in markedly decreasing the vertical dimension of a coin stacking apparatus by stacking each successive coin beneath the preceding coin, thus making the stack move upward.

Briefly, the invention may be summarized as an apparatus for stacking each unit number of coins, comprising conveyor means for delivering each unit number of coins in a row along a coin guideway leading to a stacking position. Disposed in the stacking position are stacking means for stacking the unit number of coins by placing each incoming coin under the existing stack of coins. A set of, typically three, vertical guides having parallel axes are disposed at least in part around the stack of coins formed at the stacking position.

In one preferred embodiment, the vertical guides act as wrapping rolls having parallel axes of rotation. The coins are stacked between the wrapping rolls by the stacking means of the invention such that the stacked coins are in a suitable position to be wrapped. This wrapping occurs by rotation of at least one of the wrapping rolls, which rotates the stack of coins, which causes the coins to be wrapped in a piece of wrapper strip.

One of the most pronounced features of the invention resides in the fact that the coins are stacked by placing each new coin under, rather than upon, the preceding one. This novel stacking method makes it possible to stack the coins on the plane of the coin guideway, instead of under the plane as in the prior art. The vertical dimension of the machine can thus be made remarkably less than heretofore.

Another feature of the invention is that since the coins are stacked by placing each new coin under the previously stacked ones, the vertical guides can be so disposed so as to surround at least part of the complete stack of coins formed in the stacking position. In a preferred embodiment, the coins on being stacked in the stacking position are subsequently raised only a minimal distance to a wrapping position among the wrapping rolls. The slight, vertically upward displacement of the coin stack from the stacking to the wrapping position virtually eliminates the likelihood of its collapsing on the way.

The invention further features a toothed coin-stacking wheel employed for stacking the coins by the novel method set forth previously. The stacking wheel, operating in conjunction with an adjoining abutment, enables the positive stacking of the coins by placing each new coin under the preceding one being held against the abutment. Stabilizer means may also be employed for more stable stacking of the coins, as also taught herein.

Since troubles are almost unavoidable in this type of apparatus, the preferred embodiment includes an automatic troubleshooting system incorporated with the machine in accordance with an additional feature of the invention. The various working components of the machine (e.g., the wrapping rolls, coin lifter means for moving the stack of coins from the stacking to the wrapping position, and a pair of folding hooks for folding the wrapper strip against the ends of the coin stack being wrapped in the wrapping position) are controlled by rotary cam means mounted to a camshaft. This camshaft makes one complete revolution for each wrapping cycle in which a unit number of coins are stacked and wrapped. When trouble is detected from the beginning of each wrapping cycle to a prescribed moment toward the end of the wrapping cycle when the pair of folding hooks are moved toward the opposite ends of the stack of coins being wrapped in the wrapping position, the camshaft is returned to its normal angular position by being revolved in the reverse direction, rather than in the forward direction in which it has been in rotation.

As the camshaft is immediately driven in the reverse direction in the event of trouble, the folding hooks and at least one of the wrapping rolls will travel away from the coin stack. Consequently, any such trouble as the jamming of the coins or the wrapper strip will not become worse or will totally disappear. Even if the coins or the wrapper strip remain jammed in the stacking or wrapping position after the return of the camshaft to the normal angular position, such coins or wrapper strip will be readily removable.

Preferably, the ejection of the coins, either wrapped or unwrapped, may be withheld during the reverse rotation of the camshaft back to its normal position. So left in the stacking or wrapping position, the coins will cause no additional trouble.

As mentioned above, the stacking apparatus of this invention is conveniently used in combination with a wrapping apparatus. While one such integral wrapping apparatus is described in combination with the stacking apparatus of the invention, for purposes of illustration, other suitable wrapping devices may be substituted for the illustrated wrapping device without departing from the spirit and scope of the invention.

The above and other features and advantages of this invention and the manner of realizing them will become more apparent, and the invention itself will best be understood, from a study of the following description and appended claims, with reference had to the attached drawings showing some preferred embodiments of the invention.

BRIEF DESCRIPTION OF THE DRAWINGS

FIG. 6 is an enlarged perspective view of the coin-stacking wheel and the coin lifter in their relative positions;

FIG. 7 is an enlarged perspective of the wrapping rolls shown together with means for guiding the coins and the wrapper strip;

FIG. 8 is a perspective view, on a reduced scale, of one of the wrapping rolls of FIG. 7;

DESCRIPTION OF THE PREFERRED EMBODIMENTS

Figure 1:
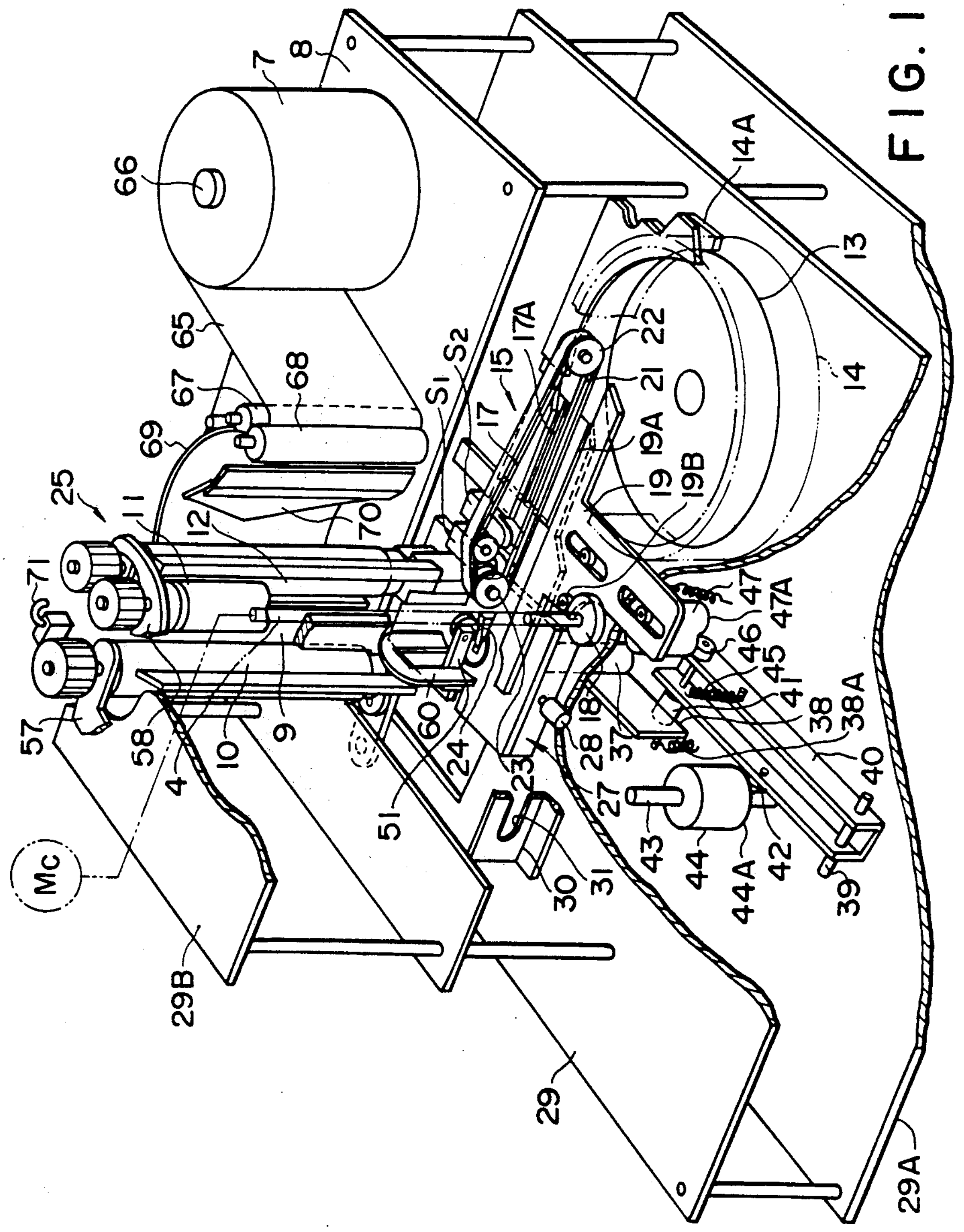
FIG. 1 is a perspective view, with parts shown broken away to reveal other parts, showing the internal configuration of the coin stacking apparatus in accordance with the invention.

The preferred embodiment will be described as a coin stacking and wrapping apparatus, as illustrated in the Figures. The general organization of the illustrated coin stacking and wrapping apparatus will become apparent from a study of FIGS. 1 and 2. Externally, as illustrated in FIG. 2, the apparatus is generally of boxlike shape, having a coin hopper 1, through which coins to be stacked and wrapped are fed into the machine, a display section 2, and a control board 3 on its top. Disposed on the front side of the machine are a receptacle 5 into which coins that have been stacked and wrapped are to be discharged, and another receptacle 6 for receiving coins that have been rejected as, for example, being of denominations different to the one being handled at any time. A roll mount 8 is also arranged on the front side of the machine, forming the bottom of a partly recessed space for accommodating a roll of wrapper strip 7. The width of this wrapper strip is so determined that it can be used for wrapping all the denominations of coins to be handled by the apparatus.

Figure 2:
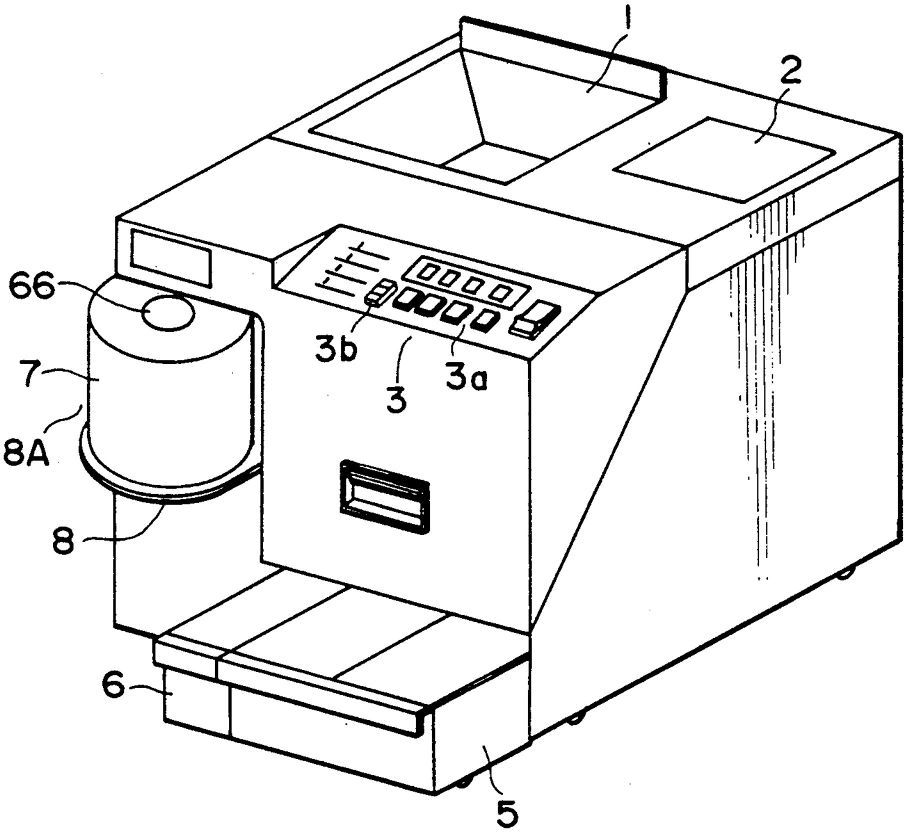
FIG. 2 is a perspective view, shown on a reduced scale, of the external construction of the apparatus.

Shown at 10, 11 and 12 in FIG. 1 are three upstanding vertical guides, which act as wrapping rolls, defining a space 9 in which the coins are to be stacked by being successively fed under the stack already formed, and then to be wrapped in the wrapper strip 7. It is to be noted, however, that the coins are not stacked and wrapped in the same position but in two vertically spaced positions in this embodiment, as will become apparent as the description proceeds. The first wrapping roll 10 rotates about an axis which is angularly displaced about a fixed vertical axis, taking different positions during stacking, wrapping, and ejection. The second wrapping roll 11 rotates about an axis which is also angularly displaceable about a fixed vertical axis to adjust to the varying diameters of coins to be wrapped but which remains fixed throughout stacking, wrapping and ejection. The third wrapping roll 12 rotates about a fixed axis. More will be said presently about these wrapping rolls 10-12.

Figure 3:
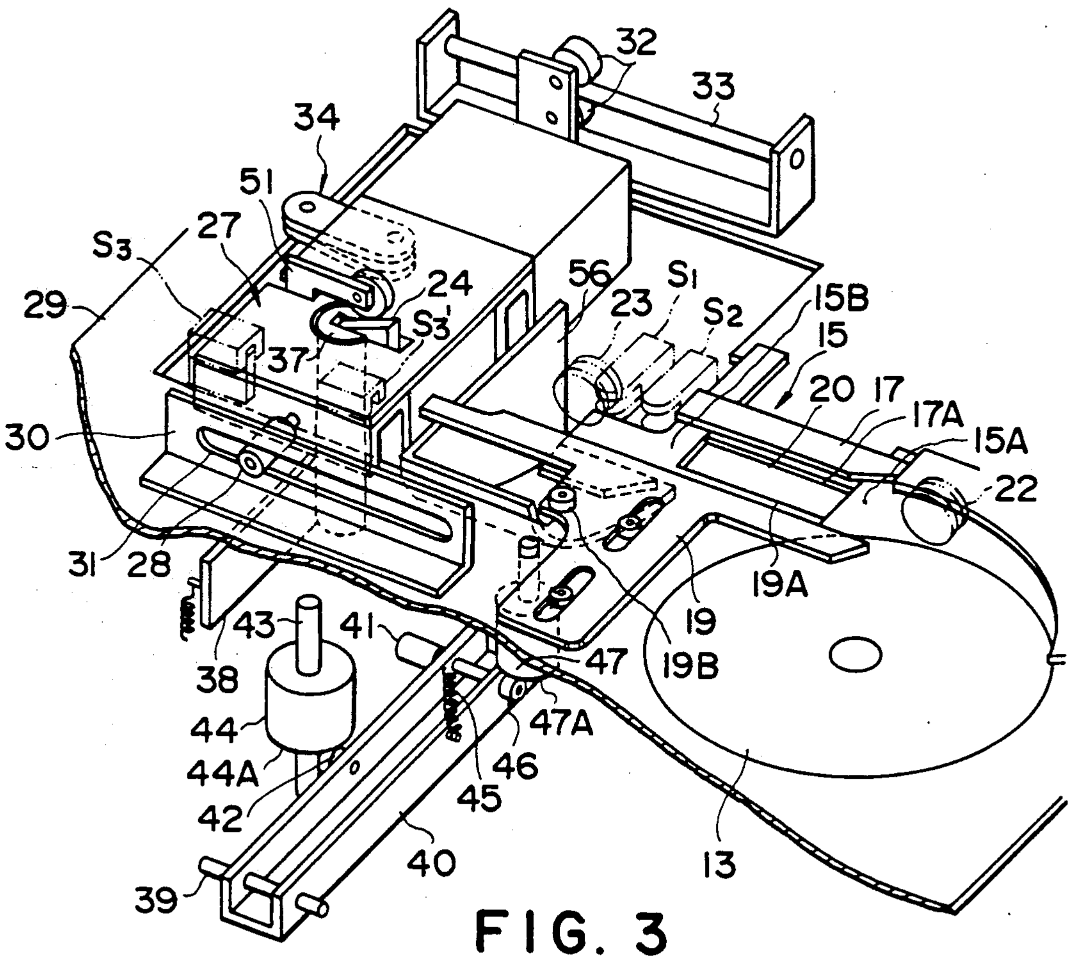
FIG. 3 is a fragmentary perspective view somewhat similar to FIG. 1 with the carriage retracted.

As shown also in FIG. 3, turntable 13 is rotatably mounted within the machine in underlying relation to the coin hopper 1, so that the coins on being charged into the hopper will drop on the turntable. The turntable 13 is provided with an annular rim 14 along its circumference. Therefore, upon rotation of the turntable 13, the coins will be centrifugally flung against, and so will be lined up along, the rim 14. Extending tangentially of the turntable 13 is a coin guideway 15, onto which the coins will successively ride in a row from the turntable. The coins will be counted while traveling along the guideway 15, in order that each prescribed number (e.g. 50) of coins may be fed at one time to the stacking and wrapping station 25 comprising the wrapping rolls 10-12. Coin sensors S1 and S2 are disposed adjacent the coin guideway 15 for sensing the coins traveling along the same. A movable coin stopper 16, FIGS. 11-14, is provided between the stoppage sensors S1 and S2. Each time the predefined number of coins have been counted, the coin stopper 16 will intrude over the guideway 15 thereby suspending coin delivery to the stacking and wrapping station 25.

FIG. 3 best indicates that the coin guideway 15 is formed by a fixed guide 17 and a movable guide 19 extending in parallel spaced relation to each other. The movable guide 19 is constrained to linear travel toward and away from the fixed guide 17 in order to adjust the spacing therebetween to the diameter of the selected denomination of coins to be stacked.

As will be noted by referring back to FIG. 1, a coin select motor Mc is provided for such movement of the movable guide 19 toward and away from the fixed guide 17. The coin select motor Mc is drivingly coupled to an upstanding shaft 4 having a cam wheel 18 fixedly mounted thereon. Rotatably mounted on the movable guide 19, a cam follower roll 19B makes rolling engagement with the periphery of the cam wheel 18. Thus, as the coin select motor Mc rotates through an angle predetermined in relation to the diameter of each denomination of coins to be stacked, the movable guide 19 will linearly travel a required distance toward or away from the fixed guide 17.

With reference directed again to FIG. 3, the two guides 17 and 19 have ledges 17A and 19A, respectively, protruding toward each other so as to underlie the opposite edge portions of each coin, permitting the same to slide over the ledges 17A and 19A as it travels along the guideway 15. Also constituting the guideway 15 are an entrance end plate 15A and an exit end 15B which are formed in coplanar relation to the ledges 17A and 19A. The ledges 17A and 19A and the end plates 15A and 15B define in combination a pit 20 through which any coin of smaller diameter than that of the desired denomination of coins to be stacked will fall down into the receptacle 6 seen in FIG. 2.

Figure 17:
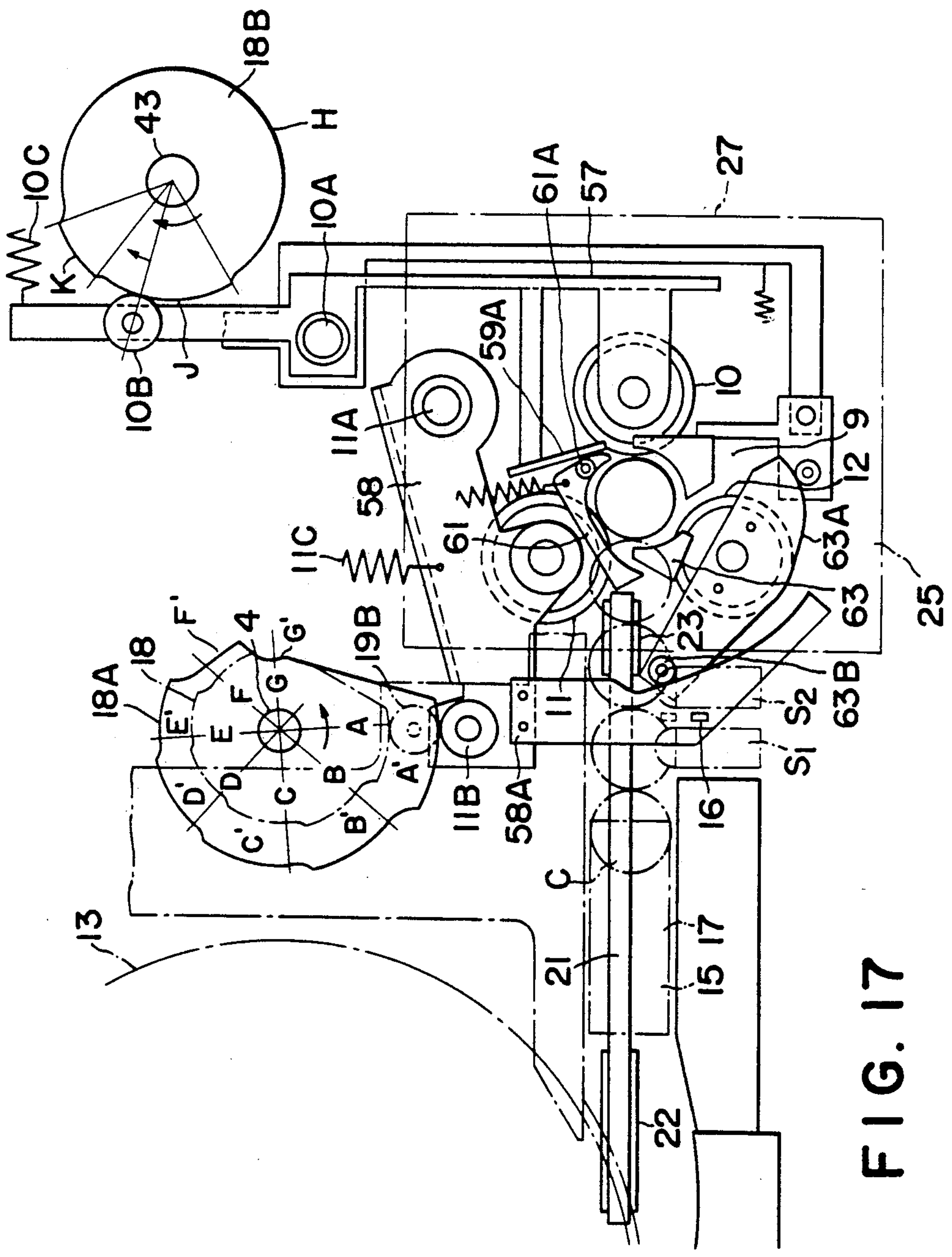
FIG. 17 is a top plan of the coin wrapping means, including the wrapping rolls, shown in the state during the stacking of coins.

As illustrated on an enlarged scale in FIG. 17, the cam wheel 18 may have its periphery contoured to provide any desired number of lobes and recesses in accordance with the desired denominations, and therefore diameters, of coins to be handled by the machine. For example, in terms of Japanese currency, the cam wheel 18 may be provided with a first lobe A for one-yen coins, a second lobe B for 50-yen coins, a third lobe C for five-yen coins, a fourth lobe D for 100-yen coins, a fifth lobe E for 10-yen coins, and a sixth lobe F for 500-Yen coins. These cam lobes A-F progressively decrease in radius in the order of enumeration, as the associated denominations of coins progressively increase in diameter in that order. Another lobe G on the cam wheel 18 is of the even less radius, desired to provide a maximum spacing between the guides 17 and 19 for dropping any denomination of coins.

A second cam wheel 18A is rigidly mounted o the same shaft 4 as is the first recited cam wheel 18. This second cam wheel is also provided with peripheral lobes A′, B′, C′, D′, E′ and F′ for 1-, 50-, 5-, 100-, 10- and 500-yen coins, respectively, which are of greater radius than the lobes A, B, C, D, E and F of the first cam wheel 18 and which are in phase therewith. A maximum spacing lobe G′ of the second cam wheel 18A is in the same angular position, and of the same radius, as in the maximum spacing lobe G of the first cam wheel 18.

In rolling engagement with the second cam wheel 18A is a cam follower roll 11B rotatably mounted on a distal end of a swing arm 58 having its proximal end pivoted at 11A on the machine frame which is not shown in FIG. 17. A helical tension spring 11C acts on the swing arm 58 to hold the cam follower roll 11B in constant engagement with the second cam wheel 18A. The noted wrapping roll 11 is rotatably mounted at a midpoint on the swing arm 58. Therefore, with the rotation of the second cam wheel 18A, the wrapping roll 11 is angularly displaced about the swing arm pivot 11A to a position predetermined in relation to each denomination of coins to be wrapped, thereby adjusting the size of the space 9 to the diameter of the coins.

Extending along the coin guideway 15 is an overhead conveyor belt 21 which is wound around a pair of pulleys 22 and 23. The underside of this conveyor belt 21 frictionally engages the row of coins for transporting the same along the guideway 15.

As shown in both FIGS. 1 and 3 and in more detail in FIG. 6, a coin stacking ratchet 24 is disposed adjacent the exit end of the coin guideway 15 and at the bottom of the space 9 where the coins are stacked and wrapped. The ratchet or wheel 24 is mounted on a horizontal motor-driven shaft 26A via a one-way clutch 26B for rotation only in a direction in which the coins are to be fed from the exit end of the guideway 15 to the stacking station. Each tooth of the ratchet 24 has a nonsloping side 24A to be abutted upon by each coin issuing from the guideway 15, and a sloping side 24B for pushing the coin to the stacking station.

Normally, the wheel 24 rotates relative to the shaft 26A under the force of the coins frictionally transported along the guideway 15 by the conveyor belt 21. However, each time the coin sensor S1 senses the 50th coin, the shaft 26A will be driven by a motor M4, FIG. 22, thereby compulsorily driving the ratchet 24 via the one-way clutch 26B. For, upon detection of the 50th coin, not only will the succeeding coins be arrested by the coin stopper 16, but also the conveyor belt 21 will be set out of forced operation and will deliver the 50th coin to the wheel 24 by inertia only. The compulsory driving of the wheel 24 is therefore necessary for positively feeding the 50th coin into the stacking space 9.

Figure 4:
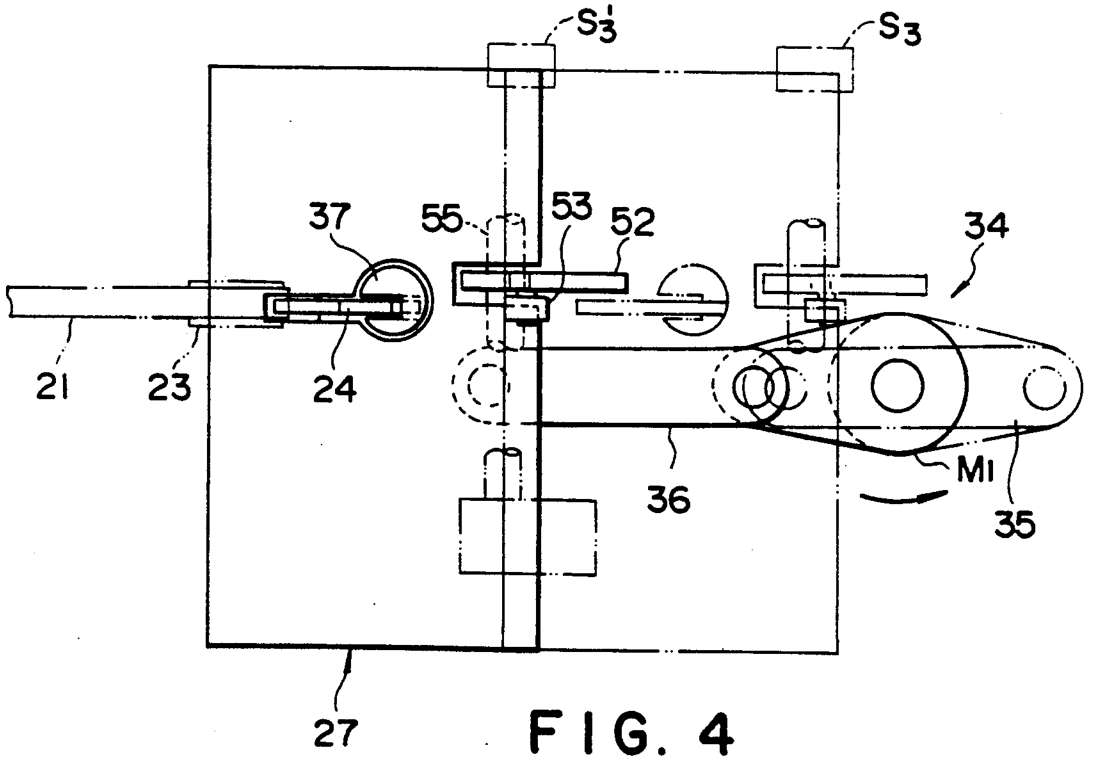
FIG. 4 is a plan view showing the carriage of FIG. 3 in its retracted and working position, together with means for driving the carriage between the two positions.

The stacking wheel 24 is rotatably mounted to a carriage 27 which is reciprocably movable in a direction parallel to the coin guideway 15 between the solid-line working position and phantom retracted positions of FIG. 4. The carriage 27 is shown also in its working position in FIGS. 1 and 9 and in its retracted position in FIGS. 3 and 10. The coins are to be stacked and wrapped when the carriage 27 is in the working position, and the wrapped stack of coins is to be ejected upon movement of the carriage to the retracted position.

As best seen in FIG. 3, the carriage 27 has a wheel 28 and a pair of vertically spaced wheels 32 on its opposite sides. The wheel 28 is rollably engaged in a horizontal guide groove 31 in a guide rail 30 of L-shaped cross section rigidly mounted on a platform 29. The pair of wheels 32 rollably engage therebetween a horizontal guide bar 33 on the platform 29. Thus the carriage 27 is rollable between the working position adjacent the exit end of the coin guideway 15 and the retracted position away therefrom.

Figure 9:
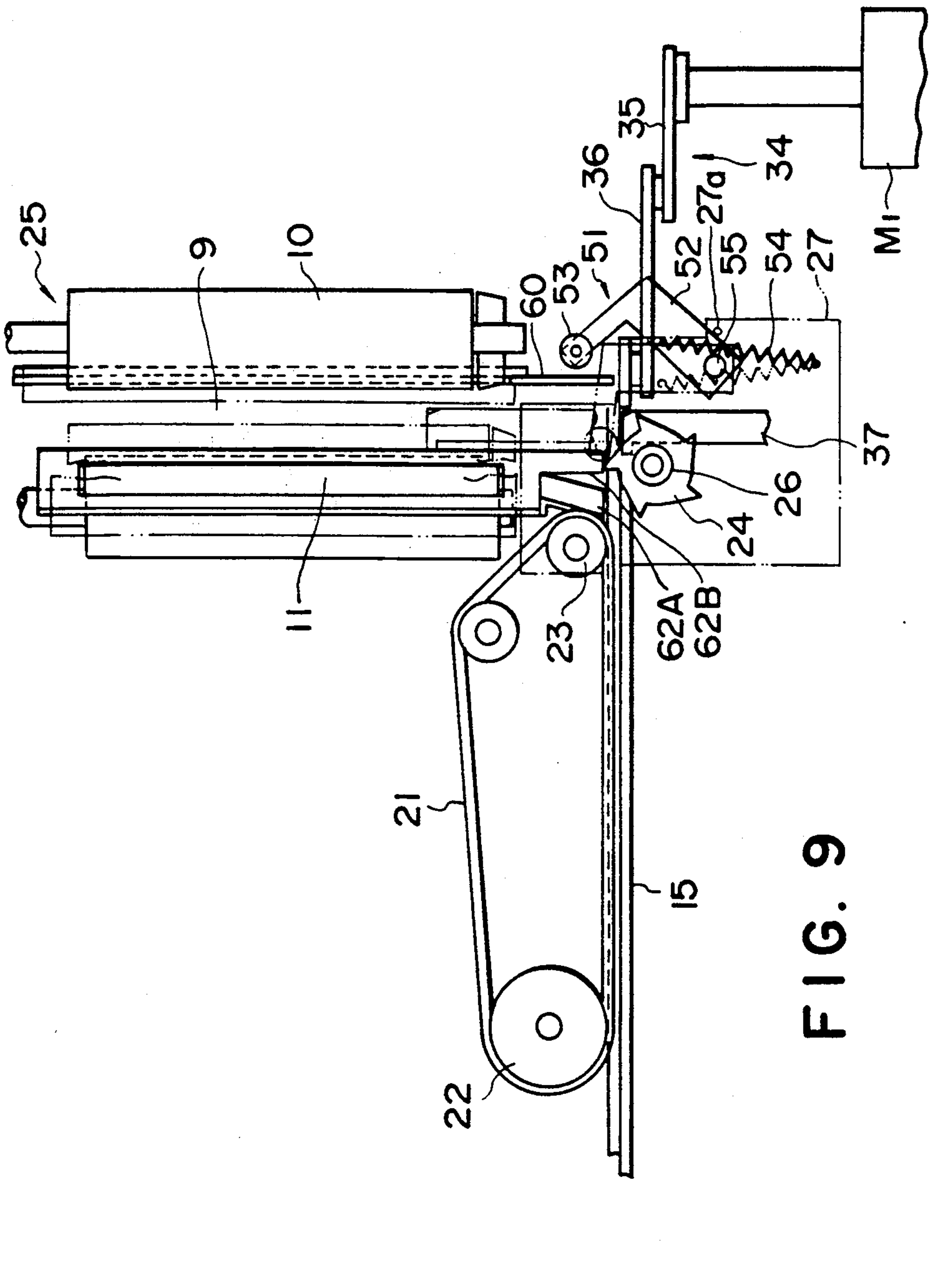
FIG. 9 is an elevation of the coin conveyor, wrapping rolls, stacking wheel, etc., shown in the state during the stacking of coins.
Figure 10:
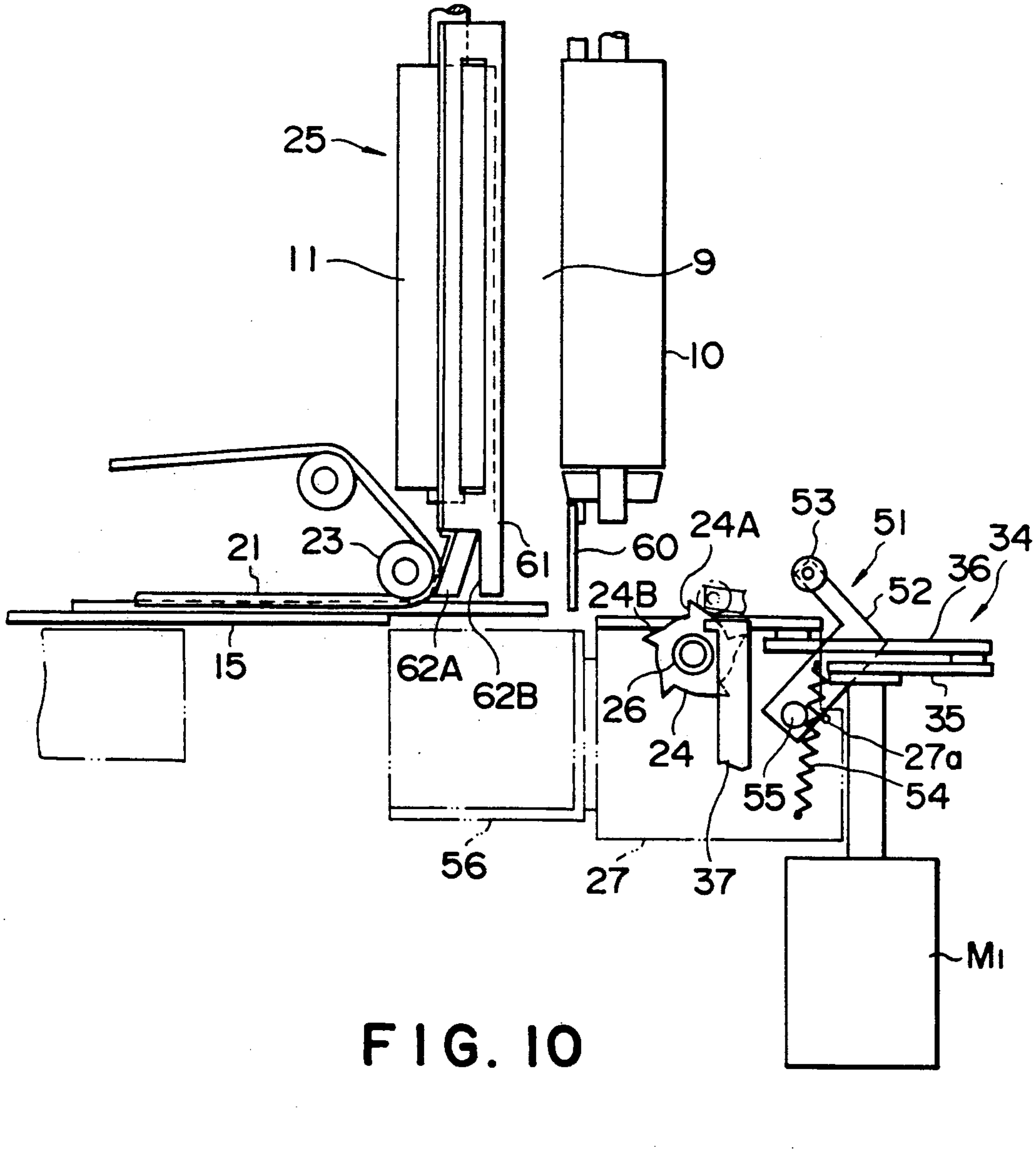
FIG. 10 is a view similar to FIG. 9 except that the noted components are shown in the state upon completion of the wrapping of the coins.

Employed for moving the carriage 27 between the two positions is an electric motor M1, FIGS. 4, 9 and 10, mounted upstandingly on the platform 29. The motor M1 will hereinafter be referred to as the eject motor since the wrapped stack of coins is ejected when the carriage 27 is retracted by that motor. A crank arm 35 has one of its ends fixedly mounted on the armature shaft of the eject motor M1 and has its other end pin-jointed to one end of a link 36. The other end of the link 36 is pin-jointed to the carriage 27. The carriage 27 travels between the working and retracted positions with every half revolution of the eject motor M1. As seen in FIG. 4, two carriage sensors S3 and S3' are mounted on the platform 29 for sensing the travel of the carriage 27 to the two positions.

As shown in both FIGS. 1 and 9, a coin lifter 37 of columnar shape for bearing the stack of coins thereon extends vertically through the carriage 27 for longitudinal displacement relative to the same. The coin lifter 37 has an arm 38 extending horizontally from its bottom end. When the carriage 27 is in the working position as shown in FIG. 1, the coin lifter arm 38 overlies a roll 41 rotatably mounted on a distal end of a swing arm 40 which has its proximal end supported by a pivot pin 39 on a platform 29A, spaced downwardly from the platform 29, for pivotal motion in a vertical plane. The swing arm 40 also has a cam follower roll 42 rotatably mounted thereto at its midpoint. A helical tension spring 45 biases the cam follower roll 42 into engagement with the contoured face 44A of a cam 44 on a camshaft 43. Rotatably mounted to the distal end of the swing arm 40, another cam follower roll 46 is engageable with the contoured face 47A of a height select cam 47 on the noted shaft 4 driven by the coin select motor Mc.

It will be observed from FIG. 6 that the coin lifter 37 has a slot 48 formed longitudinally in its upper portion for partly receiving the stacking wheel 24. When the coin lifter 37 is in its lower position, as indicated by the solid lines in FIG. 6, the wheel 24 is located adjacent the top, that is, the coin bearing face 37A, of the coin lifter, with only one of the ratchet teeth protruding upwardly therefrom. Another longitudinal slot 49 is formed in a lower portion of the coin lifter 37 for slidably receiving a guide pin 50 which is rigidly anchored to the carriage 27.

When the machine is in the state of FIG. 1, with the carriage 27 in the working position, the cam 44 which makes one complete revolution for each coin wrapping cycle acts on the cam follower roll 42 for holding the swing arm 40 pivoted to its lowermost position on the platform 29A. Then the rolls 41 and 46 on the distal end of the swing arm 40 are both held out of engagement with the coin lifter arm 38 and height select cam 47, respectively. The coin lifter 37 is also held lowered, with the guide pin 50 located in the upper extremity of the slot 49 as in FIG. 6, by a spring 38A. The carriage 27 travels between the working and retracted positions when the coin lifter arm 38 is thus out of engagement with the roll 41.

Both FIGS. 1 and 3 show a coin stabilizer mechanism 51 designed for stable stacking of the first few or several coins. As better seen in FIGS. 9 and 10, the coin stabilizer mechanism 51 comprises an L-shaped lever 52 having one end pinned at 55 to the carriage 27 for pivotal motion in a vertical plane containing the coin guideway 15. Rotatably mounted on the other end of the lever 52 is a stabilizer roll 53 for rolling engagement with the topmost one of the coins being stacked. A helical two-way tension spring 5 is anchored at one end to the carriage 27, at a point right below the pivot pin 55, and at the other end to a midpoint of the lever 52.

When the carriage 27 is in the working position, but with no coins stacked thereon, the lever 52 of the stabilizer mechanism 51 is fully pivoted in a counterclockwise direction to its working position, with the stabilizer roll 53 resting on the coin lifter 37 under the force of the two-way tension spring 54, as indicated by the broken lines in FIG. 9. Then, as the first few coins are stacked, the stabilizer roll 53 will remain urged against the topmost coin under the force of the two-way tension spring 54. With an increase in the number, and therefore height, of the stacked coins, the lever 52 will be pivoted in a clockwise direction, as viewed in FIG. 9, against the force of the two-way tension spring 54. Finally, the two-way tension spring 54 will act to force the stabilizer roll 53 away from the coin stack. A limit stop is formed at 27*a* on the carriage 27 for limiting the clockwise displacement of the lever 52 in the retracted position depicted by the solid lines in FIG. 9.

Figure 5A:
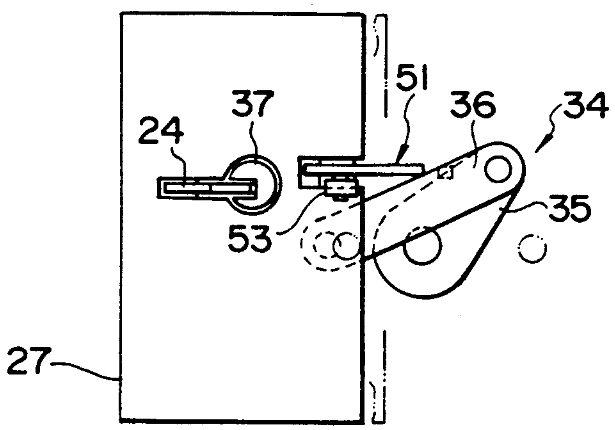
FIGS. 5A–5C are views similar to FIG. 4 but explanatory of the operation of the carriage drive means.
Figure 5B:
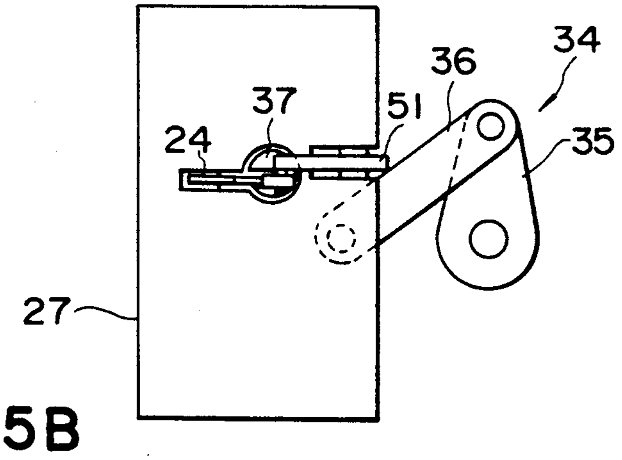
Figure 5C:
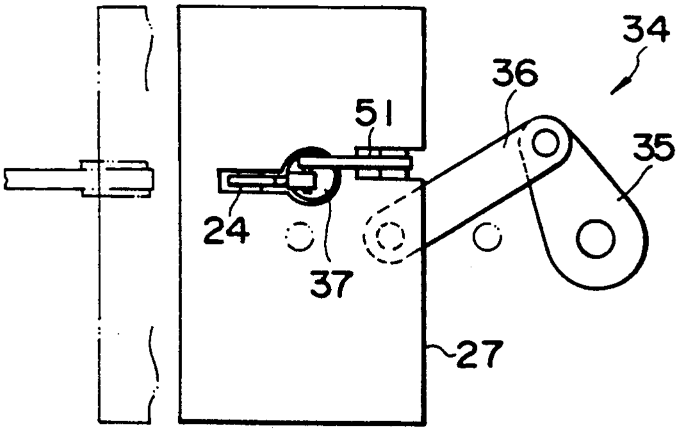

FIGS. 5A-5C are explanatory of how the lever 52 of the stabilizer mechanism 51 is returned from the retracted to the working position. The lever 52 stays in the retracted position on the carriage 27 when the latter is moved away from under the wrapping rolls 10-12 following the ejection of the stacked and wrapped coins, as shown in FIG. 5A. During the subsequent return of the carriage 27 toward its working position of FIG. 5C, the link 36 will act on the lever 52 for pivoting the same to its working position against the force of the tension spring 54.

FIG. 3 shows at 56 a coin chute mounted to the side of the carriage 27 facing the coin guideway 15. When the carriage 27 is retracted as shown in this figure, the coin chute 56 will come under the wrapping rolls 10-12 for receiving the wrapped stack of coins for ejection into the receptacle 5 of FIG. 2.

The wrapping rolls 10–12 and means more or less directly associated therewith can be of largely conventional design. Thus, as shown in FIG. 1, the first wrapping roll 10 is rotatably supported between a pair of swing arms 57, one shown, whereas the second and third wrapping rolls 11 and 12 are both rotatably supported between a pair of swing arms or yokes 58, also one shown. The arms 57 and 58 are pivoted on the two vertically spaced platforms 8 and 29B. One or more, preferably all, of the wrapping rolls 10–12 may be directly motor-driven for wrapping the stack of coins in the wrapper strip 65 unwound from its roll 7, as will be later explained with reference to FIG. 21.

As clearly seen in FIG. 17, one of the arms 57 supporting the first wrapping roll 10 is medially pivoted at 10A and rotatably carries the first wrapping roll at one end and a cam follower roll 10B at the other end. A spring 10C biases the cam follower roll 10B into rolling engagement with the periphery of a cam wheel 18B on the camshaft 43 set forth with reference to FIGS. 1 and 3. The periphery of the cam wheel 18B is contoured to provide a first portion H, extending through an angle of approximately 270 degrees, for moving the first wrapping roll 10 to a wrapping position for close contact with the stack of coins, a second portion J for moving the first wrapping roll to stacking position slightly retracted from the wrapping position, and a third portion K for fully retracting first the wrapping roll from the stack of coins. Normally, as shown in FIG. 17, the cam follower roll 10B rides on the second portion J of the cam wheel 18B, with the first wrapping roll 10 held in the stacking position.

With reference to FIGS. 1, 7 and 17 the first wrapping roll 10 which stands opposite the exit end of the coin guideway 15 has a wrapper guide 59A rigidly mounted to its supporting arms 57. Depending from the wrapper guide 59A is an abutment 60 against which the coins will butt on being successively fed under the existing stack. The first wrapping roll 10 is also provided with another wrapper guide 59B movable with the pair of bearing portions 10A of the first wrapping roll 10.

As illustrated also in FIG. 8, the second wrapping roll 11 has a guide 61 extending throughout its length. Depending from this guide is a slanting coin guide 62A and an upright guide 62B. The third wrapping roll 12 also has a wrapper guide 63, with a coin guide 64 formed thereunder. The lower bearing portions 10A and 12A of the wrapping rolls 10 and 12 are tapered for smooth stacking of the coins from the abutment 60 and coin guide 64 to the surfaces of the wrapping rolls 10 and 12.

With reference again to FIG. 1 the roll 7 of wrapper strip 65 is placed on the platform 8 for rotation about an upstanding spindle 66. Unwound from this roll, the wrapper strip 65 is threaded between a pair of feed rolls 67 and 68, then past an arcuate wrapper guide 69 and a cutter blade 70 having a V-shaped cutting edge, and finally between the first and third wrapping rolls 10 and 12. The wrapper strip 65 is to be wrapped by the wrapping rolls 10–12 around the stack of coins as the same is raised by the coin lifter 37 to the wrapping position which, in this embodiment, is slightly above the stacking position. A pair of folding hooks, one seen at 71 in FIG. 1, are conventionally provided for folding the opposite side edges of the wrapper strip 65 against the ends of the coin stack.

Figure 21:
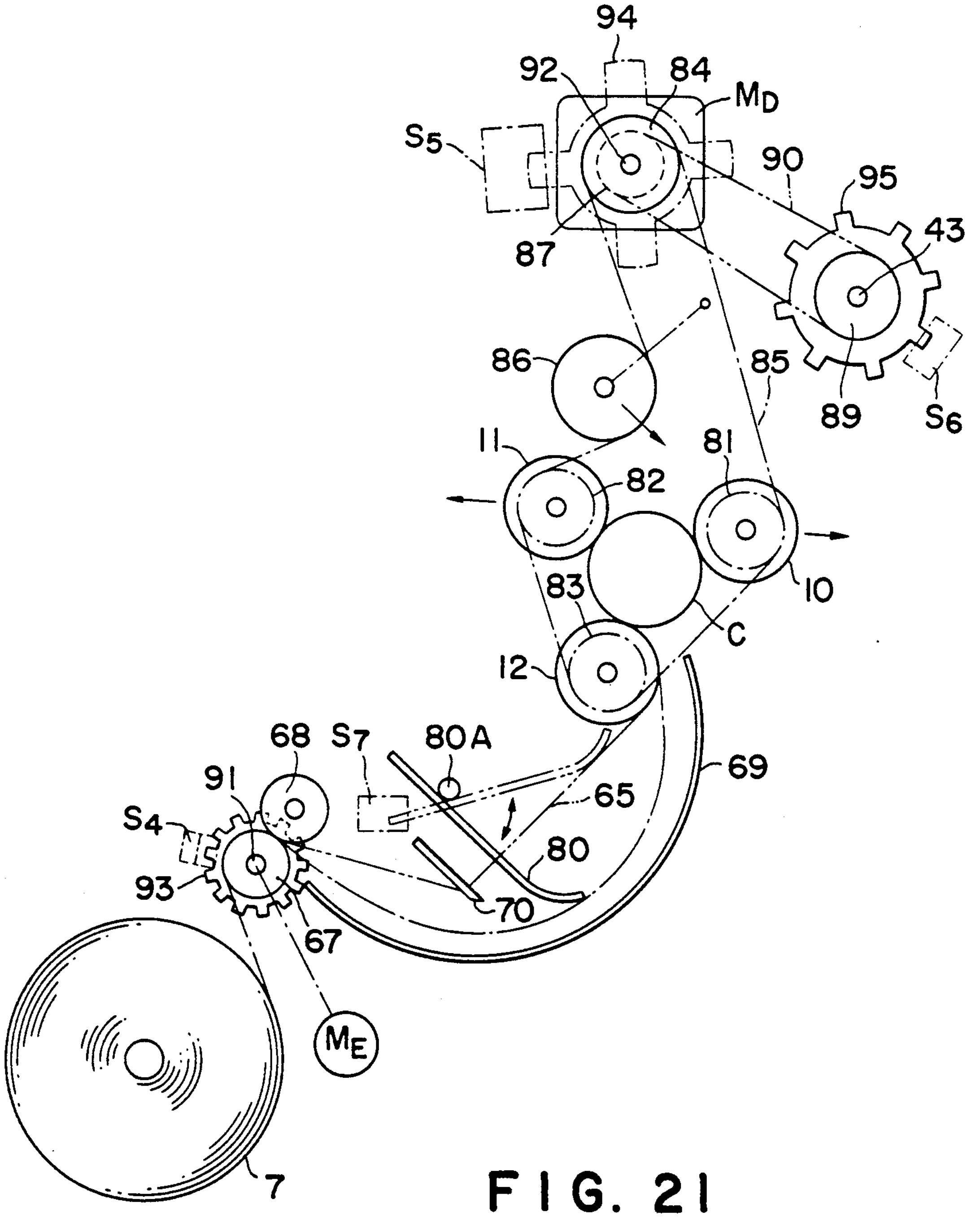
FIG. 21 is a diagrammatic top plan of the means for supplying the wrapper strip to the wrapping rolls and the means for driving the wrapping rolls.

Reference is now directed to FIG. 21 for a more detailed study of how the wrapper strip 65 is fed from its roll 7 to the wrapping position bounded by the three wrapping rolls 10–12, and of how these wrapping rolls are driven for wrapping the coin stack in the wrapper strip. On being threaded between the pair of feed rolls 67 and 68, the wrapper strip 65 travels along the arcuate wrapper guide 69 past the cutter blade 70 and is directed to the third wrapping roll 12. Then, guided by the successive wrapper guides 63, 61, 59A and 59B, the wrapper strip 65 travels past the second and first wrapping rolls 11 and 10, successively, and back to the third wrapping roll 12 and so is wound around the stack of coins, designated C, being caught and revolved by the wrapping rolls 10–12.

Disposed downstream of the cutter blade 70 with respect to the traveling direction of the wrapper strip 65 is a tension plate 80 swingable about a vertical pivot 80A for imparting tension to the wrapper strip. The tension plate 80 is sprung toward the position indicated by the solid lines in FIG. 21 for pressing the wrapper strip 65 toward the arcuate wrapper guide 69. When the wrapper strip 65 is pulled forwardly by having its leading end caught between the wrapping roll 12 and the coin stack C, the tension plate 80 will be pivoted to the phantom position against the bias of the unshown spring thereby imparting tension to the wrapper strip so that it may be cut more easily by the cutter blade 70.

The feed roller 67 is driven by a wrapper feed motor $M_E$, in a direction for unwinding the wrapper strip 65 from its roll 7. The other feed roller 68 is sprung against the motor-driven feed roller 67 for frictionally engaging the wrapper strip therebetween.

It will also be noted from FIG. 21 that all the wrapping rolls 10–12 are jointly driven from a wrapping motor $M_D$ in this particular embodiment, although only one of the wrapping rolls could be driven for wrapping the coin stack C. The wrapping rolls 10–12 are coaxially provided with driven pulleys 81–83, respectively, which are capable of joint rotation therewith. A drive pulley 84 is mounted directly on the armature shaft 92 of the wrapping motor $M_D$. Extending around these pulleys 81–84, an endless belt 85 imparts the rotation of the wrapping motor to the wrapping rolls 10–12, rotating the latter in the same direction. A displaceable tension pulley is provided at 86 for holding the tension of the belt 85 constant in the face of the displacements of the wrapping rolls 10 and 11.

The wrapping motor $M_D$ is also used for driving the camshaft 43 via an endless belt 90 extending around another pulley 87 on the motor shaft and a pulley 89 on the camshaft. Accordingly, the camshaft 43 rotates in synchronism with the wrapping rolls 10–12.

Rotation sensors S4, S5 and S6 are provided for sensing the rotations of the wrapper feed motor $M_E$, wrapping motor $M_D$, and camshaft 43, respectively. These sensors optically detect the rotation of the associated motors and camshaft from toothed rotary members 93–95 which are mounted fast on the feed roll shaft 91, wrapping motor shaft 92 and camshaft 43, respectively, for joint rotation therewith. A wrapper severance sensor S7 is disposed adjacent the pivot 80A of the tension plate 80 for sensing the severance of the wrapper strip 65 by the cutter blade 70 from the counterclockwise rotation, as viewed in FIG. 21, of the tension plate 80. These sensors S4–S7 constitute parts of means for detecting troubles that may occur in the operation of the machine.

Figure 22:
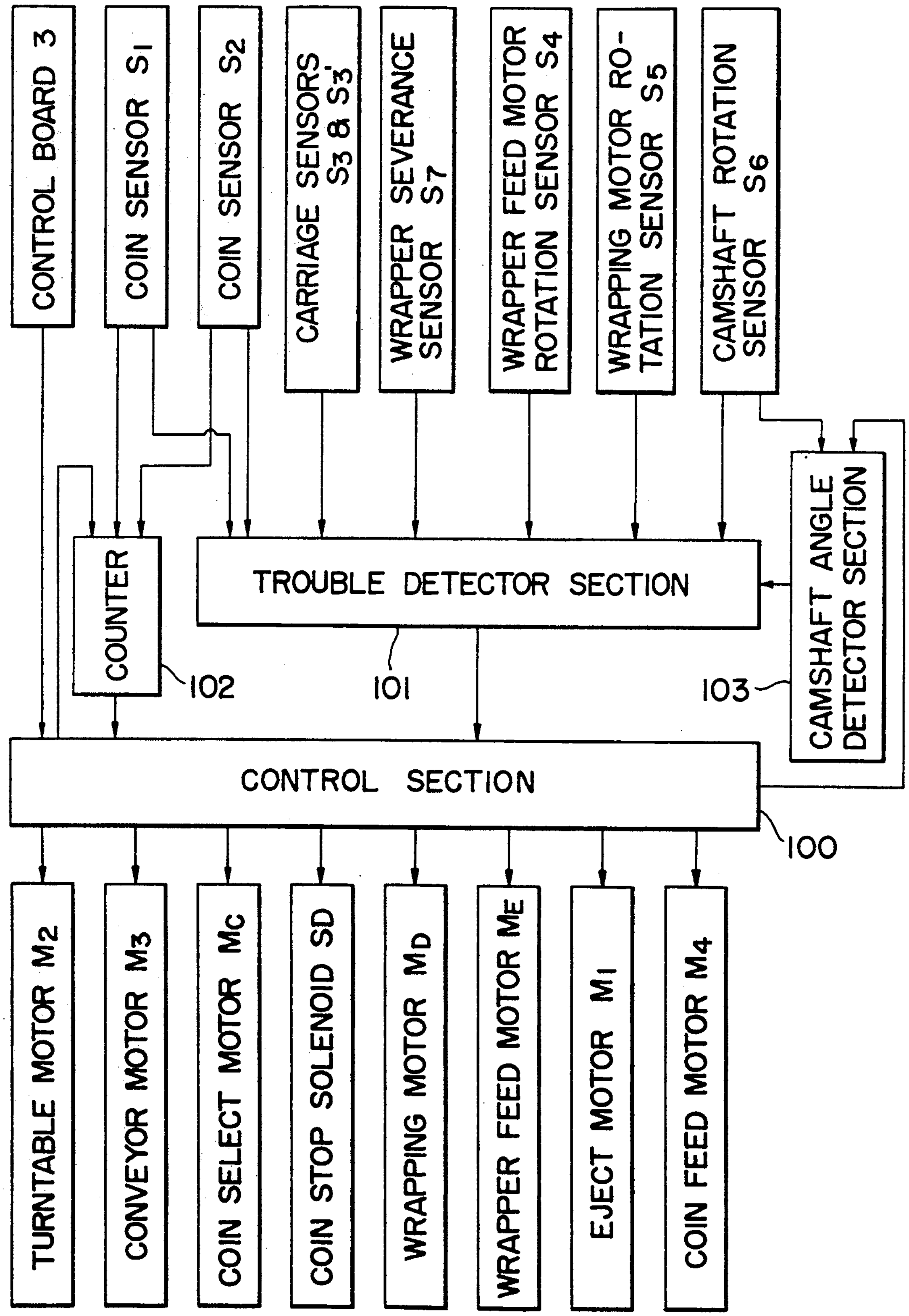
FIG. 22 is a block diagram of the electrical control system of the machine.

As illustrated block-diagrammatically in FIG. 22, the electric control circuitry of this machine includes a control section 100 for controllably driving the eject motor M1 for the ejection of the wrapped stack of coins, the turntable motor M2 for driving the turntable 13, the conveyor motor M3 for driving the conveyor belt 21, the coin feed motor M4 for driving the stacking wheel 24, the coin select motor $M_D$ for driving the coin select shaft 4, the wrapping motor $M_C$ for driving the wrapping rolls 10–12 and camshaft 43, the wrapper feed motor $M_E$ for driving the wrapper feed roll 67, and the coin stop solenoid SD for actuating the coin stopper 16. The control section 100 have inputs connected to the control board 3, a trouble detector section 101, and a counter 102. The coin sensors S1 and S2, sensing the coins being fed along the guideway 15 to the stacking and wrapping station, are both electrically connected to the counter 102.

The trouble detector section 101 has inputs coupled to the coin sensors S1 and S2, carriage sensors S3 and S3', wrapper feed motor rotation sensor S4, wrapping motor rotation sensor S5, camshaft rotation sensor S6, wrapper severance sensor S7, and camshaft angle detector section 103 for detecting the angle of rotation of the camshaft 43. The camshaft angle detector section 103 comprises means for generating a time-base signal, means for counting the pulses generated by the camshaft rotation sensor S6 during the rotation of the camshaft 43, and means for discriminating between the forward and reverse rotations of the camshaft in response to a signal from the control section 100. It is among the functions of the angle detector section 103 to determine the angle of forward rotation of the camshaft 43 with respect to a prescribed normal angular position, and to determine the angle of reverse rotation of the camshaft from a given angular position.

The trouble detector section 101 detects a variety of troubles that may happen during the counting, stacking and wrapping of the coins by the apparatus, in response to the output signals of the sensors S1–S7 connected thereto. The following is a discussion of how the trouble detector section 101 finds, and deals with, troubles during the stacking of each prescribed number (e.g., 50) of coins.

1. Upon counting of every 50 coins:

Upon counting of every 50 coins by the counter 102 in response to the output from the first coin sensor S1, the control section 100 energizes the coin stopper solenoid SD for arresting the succeeding coins on the coin guideway 15. If the second coin sensor S2 still detects a coin upon lapse of a preassigned time following the energization of the solenoid SC, then the trouble detector section 101 delivers to the control section 100 a stacking error signal indicative of the fact that the coins may have not been correctly stacked.

2. During counting:

The trouble detector section 101 also delivers a stacking error signal to the control section 100 when either of the coin sensors S1 and S2 continues detecting a coin for a prescribed time.

3. During counting:

The trouble detector section 101 also delivers a stacking error signal to the control section 100 when the counts of the two coin counters S1 and S2 disagree.

Wrapping troubles are detected by the trouble detector section 101 as follows:

1. When the output signal of the wrapper feed motor rotation sensor S4 indicates either the non-rotation, or a reduction in the speed of rotation, of the wrapper feed motor $M_E$ during the prescribed periods when the motor is required to be in rotation. The possible causes of wrapping trouble may then be the jamming of the wrapper strip between the pair of feed rolls 67 and 68, or the malfunctioning of the wrapper feed motor $M_E$ itself.

2. When the output signal of the wrapping motor rotation sensor S5 indicates either the non-rotation, or a reduction in the speed of rotation, of the wrapping motor $M_D$. The possible causes of wrapping trouble may then be either the jamming of the coins or the wrapper strip, or the malfunctioning of the wrapping motor itself.

3. When the output signal of the camshaft rotation sensor S6 indicates either the non-rotation, or a reduction in the speed of rotation, of the camshaft 43. The possible causes of wrapping trouble may then be either the jamming of the coins or the wrapper strip, or the destruction of some part of the wrapping means.

4. When the wrapper severance sensor S7 provides no signal indicative of the cutting of the wrapper strip 65 by the cutter blade 70. The possible causes of wrapping trouble may then be either the non-operation of the cutter blade 70, the non-wrapping of the wrapper strip around the coin stack C, or the non-supply of the wrapper strip. The wrapper severance sensor S7 will not produce the wrapper severance signal when the tension plate 80 is not sufficiently provided, or not pivoted at all, by the wrapper strip 65.

5. When the carriage sensors S3 and S3' do not detect the displacement of the carriage 27 to the retracted or the working position by the eject motor M1 at required moments. The possible causes of wrapping trouble may then be the jamming of the coins in the chute 56 or between the wrapping rolls 10–12, resulting in the impediment of carriage displacement.

Figure 23:
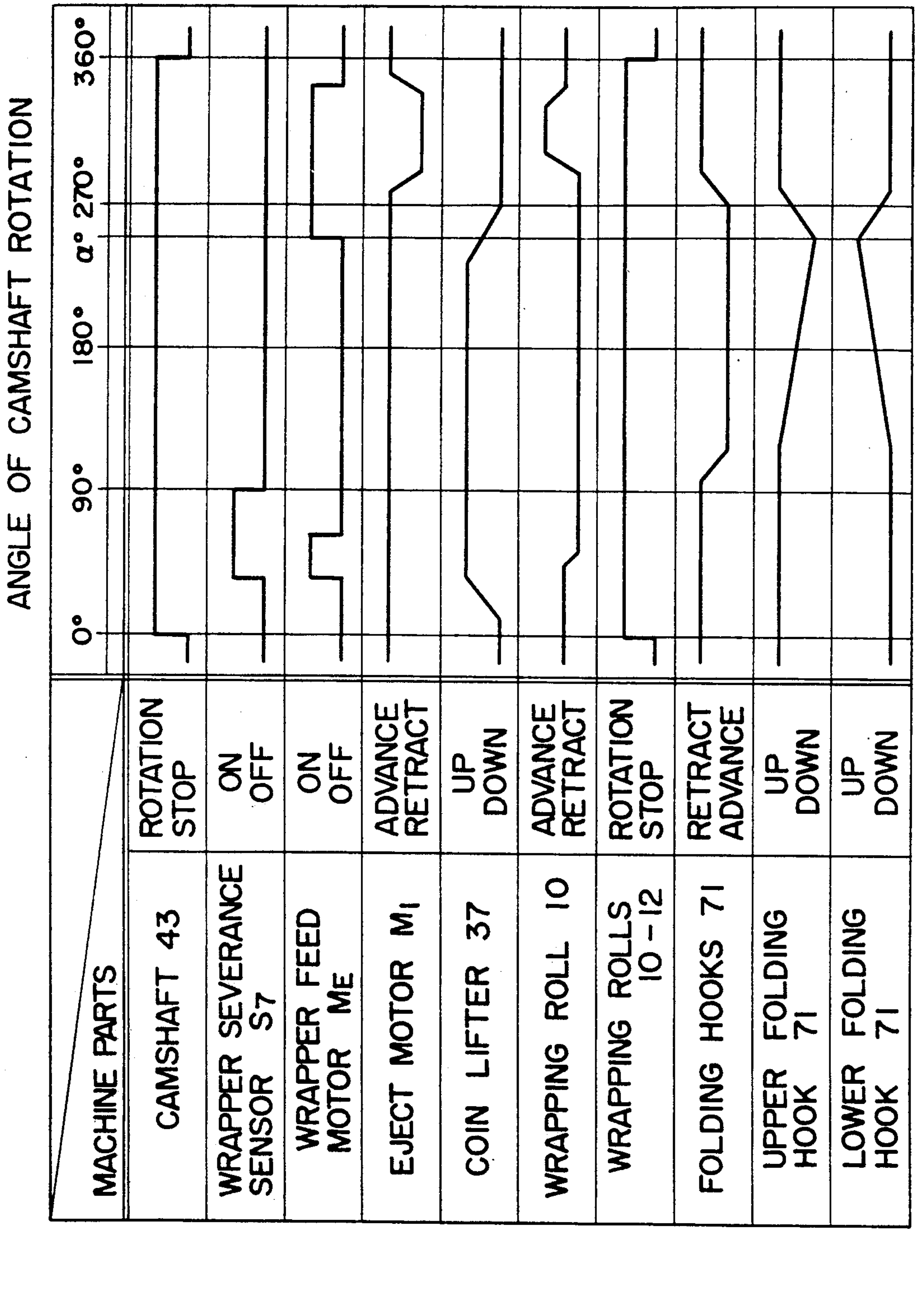
FIG. 23 is a timing diagram explanatory of the operation of the machine.

Upon detection of the various wrapping trouble enumerated in the foregoing, the trouble detector section 101 will signal to the control section 100, causing the latter to hold the wrapper feed motor $M_E$ and wrapping motor $M_D$ out of operation. Also, the trouble detector section 101 will cause the control section 100 either to set the wrapping motor $M_D$ into reverse rotation if the angular position of the camshaft 43 at the moment of the occurrence of the trouble is less than $\alpha$ degrees from its normal angular position and, if not, to maintain the wrapping motor in forward rotation. As indicated in the timing diagram of FIG. 23, showing the operations of the various working parts of the apparatus in proper time relation to one another, the angle $\alpha$ is preferably from 180 to 270 degrees. The signal indicative of the angular position of the camshaft 43 is supplied in real time from the camshaft angle detector section 103 to the trouble detector section 101. The following factors enter into the determination of the angle $\alpha$.

As will be noted from FIG. 23, the camshaft 43 is in the position of the angle $\alpha$ when, in each cycle of coin wrapping operation, the pair of folding hooks 71 will come closest to each other if the camshaft is rotated in the absence of a coin stack to be wrapped. Incidentally, in the presence of a coin stack in the wrapping position, the pair of folding hooks 71 will come closest to each other at an earlier moment. Further, the higher the coin stack, the earlier will the folding hooks come closest to each other.

Let it be assumed that some wrapping trouble has taken place when the camshaft 43 does not yet revolve through the angle $\alpha$ in the forward direction from its normal angular position and when the pair of folding hooks 71 are either approaching, or are held against, the opposite ends of the coin stack. If then the rotational direction of the camshaft 43 is reversed, the folding hooks 71 will travel away from each other without being impeded by the coins C that have jammed in the wrapping position.

Let us suppose, then, that some wrapping trouble has occurred after the camshaft 43 has revolved more than the angle $\alpha$ from its normal position. Should the direction of rotation of the camshaft 43 be reversed in this case, the pair of folding hooks 71 would move apart after traveling toward the ends of the coin stack. The wrapping trouble may be due to the jamming of the coins in the wrapping position. If so, the folding hooks 71 might hit the jamming coins during their reversed movement toward each other, possibly resulting in the destruction of one or both of the folding hooks or of associated means. It is therefore desirable that the camshaft 43 be maintained in forward rotation for its return to the normal angular position in cases where some wrapping trouble has occurred when the camshaft is in the position of the angle $\alpha$ or more.

Experiment has proved that the majority of wrapping troubles occur before the camshaft 43 revolves through the angle $\alpha$ in each wrapping cycle. Even in rare cases where some wrapping trouble takes place at a later moment, the camshaft 43 will be smoothly returned to its normal angular position by continued forward rotation because the winding of the wrapper strip around the coin stack and the folding of the side edges of the wrapper strip against the ends of the coin stack are completed by that moment. The wrapping trouble in such cases will be due to reasons other than the jamming of the coins or the wrapper strip among the wrapping rolls 10–12.

The following is a discussion of various wrapping troubles detected by the carriage sensors S3 and S3', wrapper feed motor rotation sensor S4, wrapping motor rotation sensor S5, camshaft rotation sensor S6 and wrapper severance sensor S7, and of whether the camshaft 43 is reversed in rotation or maintained in forward rotation when such troubles are detected. The discussion will be better understood by referring to the timing diagram of FIG. 23.

Wrapping troubles associated with the carriage sensors S3 and S3' will occur when the angle of rotation of the camshaft 43 is between $\alpha$ and 360 degrees. The camshaft 43 is therefore maintained in forward rotation.

The wrapper feed motor $M_E$ is energized twice during each wrapping cycle, first during part of the first 90 degrees rotation of the camshaft 43 and second after the $\alpha$ degrees rotation of the camshaft. The camshaft 43 is reversed in rotation if wrapping trouble is detected by the wrapper feed motor rotation sensor S4 during the first wrapper feed time, and is maintained in forward rotation of wrapping trouble is detected during the second wrapper feed time.

Wrapping troubles relating to the wrapping motor rotation sensor S5 and camshaft rotation sensor S6 can happen throughout the complete revolution of the camshaft 43. Thus the camshaft 43 may be reversed in rotation if trouble happens before the camshaft revolves through the angle $\alpha$, and may be maintained in forward rotation if trouble occurs thereafter. Possible causes of the wrapping trouble taking place in connection with the sensors S5 and S6 before the camshaft 43 revolves the prescribed angle include the jamming of the coins or wrapper strip at the stacking and wrapping station 25, or the malfunctioning of the wrapping motor $M_D$ or of the wrapping mechanism. Possible causes of the wrapping trouble arising in connection with the sensors S5 and S6 after the camshaft 43 has revolved beyond the prescribed angle include the malfunctioning of the wrapping motor $M_D$ or of the wrapping mechanism but, usually, not the jamming of the coins or wrapper strip at the stacking and wrapping station 25.

Wrapping trouble in connection with the wrapper severance sensor S7 will occur during the first 90 degrees rotation of the camshaft 43. This camshaft is therefore reversed in rotation when such trouble is detected.

In operation, for wrapping each number of coins of a desired denomination by the apparatus of the foregoing construction, the control board 3 on its top is first operated upon for setting the apparatus in the wrapping mode as distinguished from the counting mode. One of a set of coin select push buttons on the control board may also be activated which corresponds to the denomination of the coins to be wrapped. In response to the input data the control section 100 will preset on the counter 102 a prescribed unit number of the coins to be wrapped. Also, as the control section 100 sets the coin select motor Mc into rotation, the first cam wheel 18 on the coin select shaft 4 will act on the cam follower wheel 19B, causing the movable guide 19 to move toward or away from the fixed guide 17 to an extent necessary to adjust the spacing (i.e., the width of the coin guideway 15) therebetween to the diameter of the coins to be wrapped. The height select cam 47 will also rotate so that the portion of its contoured face 47A which corresponds to the selected denomination of coins may overlie the cam follower roll 46 on the swing arm 40.

The size, in a horizontal plane, of the space 9 bounded by the three wrapping rolls 10–12 must also be adjusted to the diameter of the selected denomination of coins. The second cam wheel 18A, FIG. 17, on the coin select shaft 4 will act on one of the swing arms 58 thereby pivoting the same in either direction about the axis at 11A. With such pivotal displacement of the swing arms 58 the second wrapping roll 11 will move either in a direction for increasing the horizontal selectional size of the space 9, as in FIG. 11, or in the opposite direction for decreasing the size as in FIG. 13. FIG. 17 also shows the second wrapping roll 11 moved to the same position as in FIG. 13 for the stacking and wrapping of minimum diameter coins.

Figure 11:
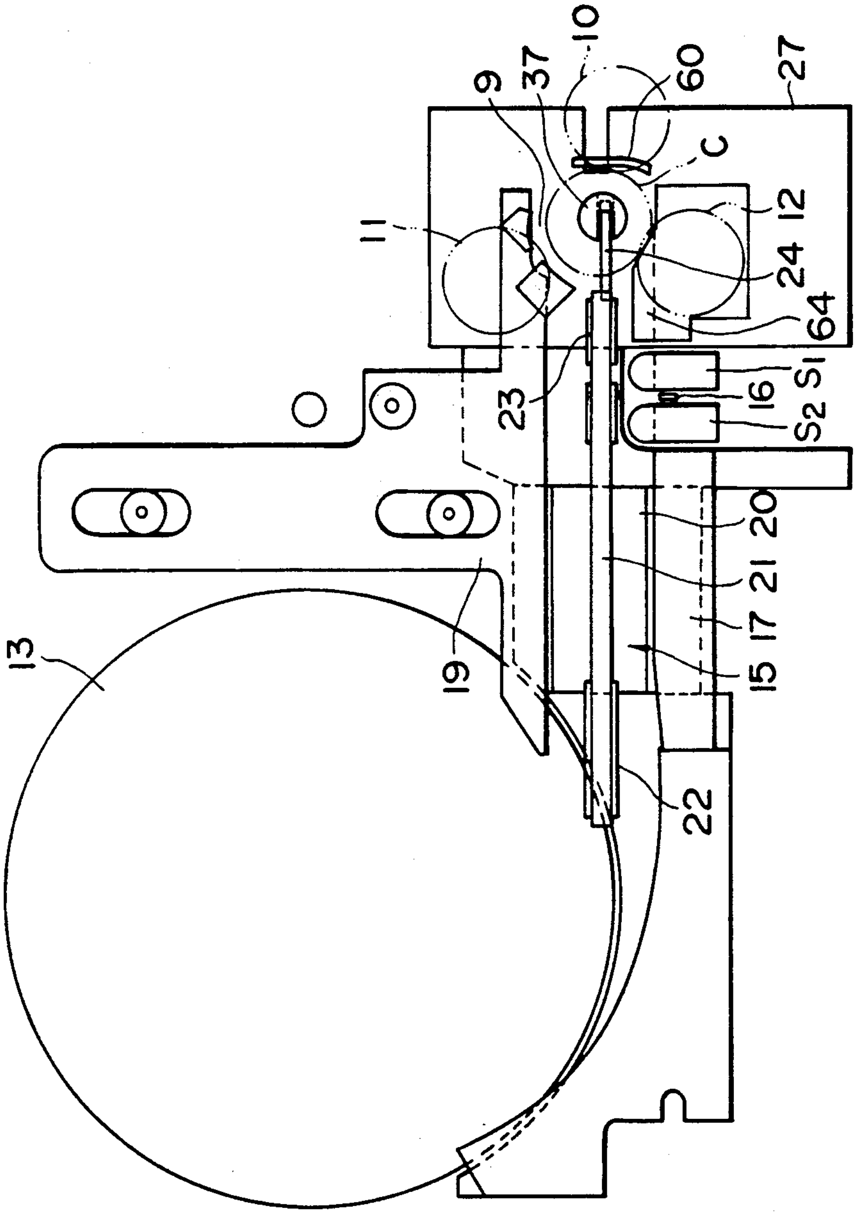
FIG. 11 is a plan view showing approximately the same parts as FIGS. 9 and 10 but explanatory of the relative positions of the wrapping rolls during the stacking of a relatively large-diameter coins.
Figure 13:
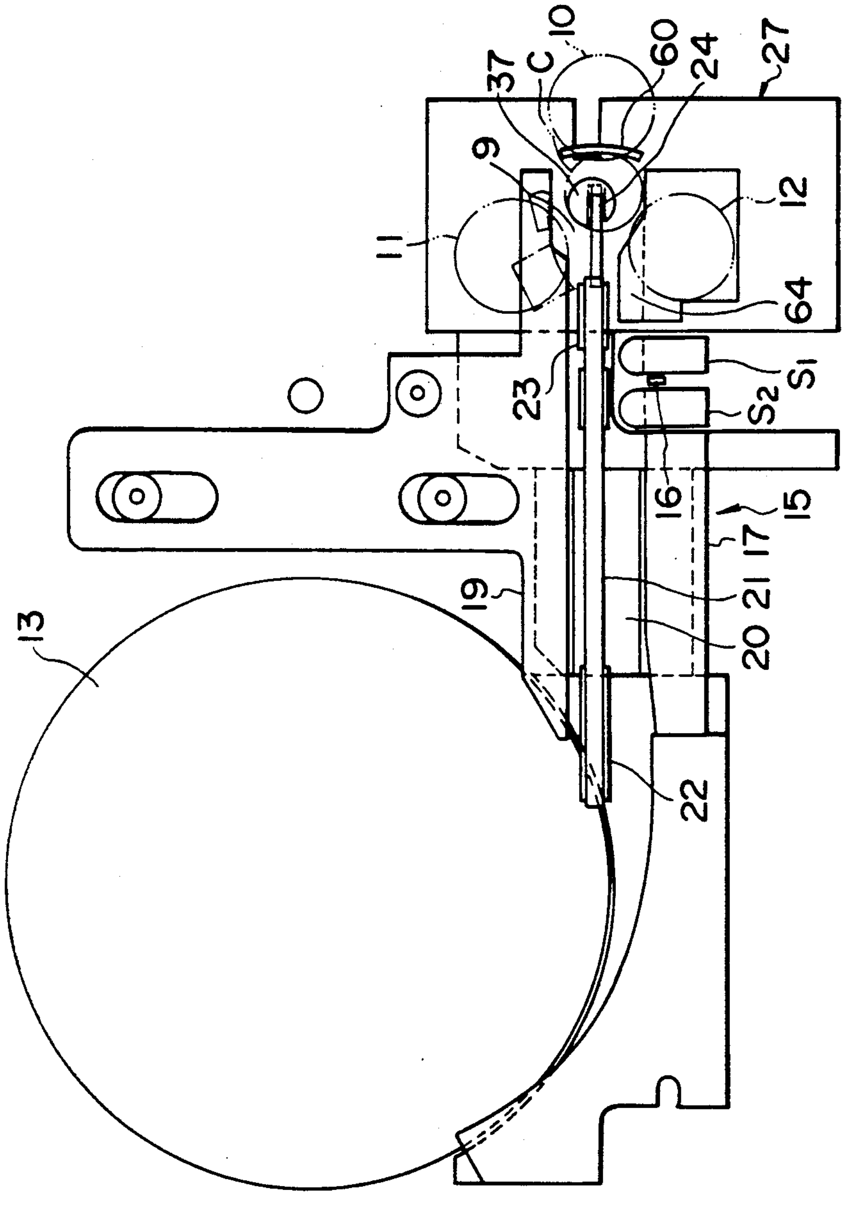
FIG. 13 is also a view similar to FIG. 11 but explanatory of the relative positions of the wrapping rolls during the stacking of a relatively small-diameter coins.

The camshaft 43 is now held out of rotation, so that the cam wheel 18B, FIG. 17, on this shaft will maintain the first wrapping roll 10 in the same position regardless of the displacement of the second wrapping roll 11 t the position of either FIG. 11 or 13.

Now the apparatus may be set into wrapping operation, as by the actuation of a switch button on the control board 3. The control section 100 will respond by first setting the eject motor M1 into rotation, with the result that the carriage 27 travels from the phantom retracted position of FIG. 4 to the solid-line working position. Ascertaining the travel of the carriage 27 to the working position by the carriage sensor S3' via the trouble detector section 101, the control section will proceed to set the turntable motor M2 and the conveyor motor M3 into rotation, resulting in the rotation of the turntable 13 and the conveyor belt 21.

It is assumed that the coins to be wrapped have already been loaded on the turntable 13 by being charged into the hopper 1. With the rotation of the turntable 13 the coins will be centrifugally aligned along the rim 14 with the aid of the overhang 14A which functions to prevent the stacking of two or more coins on the turntable. The row of coins will successively enter the guideway 15 and will travel thereover in frictional contact with the overhead conveyor belt 21.

Figure 15A:
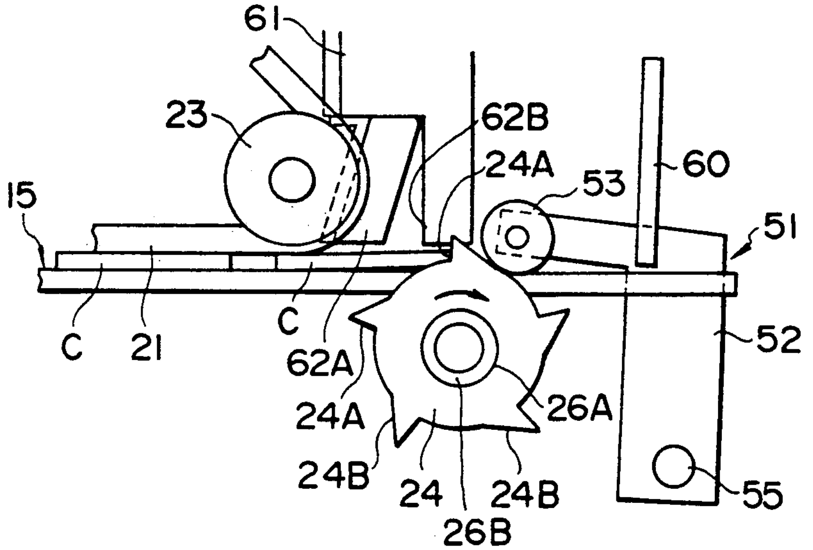
FIGS. 15A–15M are a series of elevational views explanatory of the way in which relatively large-diameter coins are stacked in the stacking position.
Figure 15B:
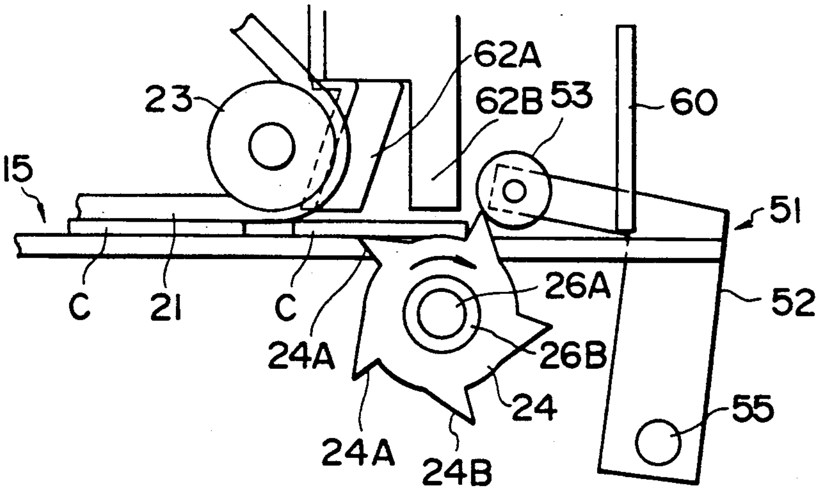

In FIG. 15A is shown the foremost coin C arriving at the exit end of the guideway 15 and butting on the coin engagement means which is comprised of the non-sloping side 24A of a tooth of the feed ratchet 24. Still driven by the conveyor belt 21, this coin C will revolve the feed ratchet 24 in a clockwise direction as shown in FIG. 15B. As will be understood by referring back to FIG. 6, the shaft 26A on which the feed ratchet 24 is mounted does not rotate at this time, permitting the clockwise rotation of the feed ratchet via the one-way clutch 26B. Guided by the slanting coin guide 62A, FIG. 7, the coin C will travel toward the fixed-axis wrapping roll 12 and will continue to move forwardly along the coin guide 64.

Figure 15C:
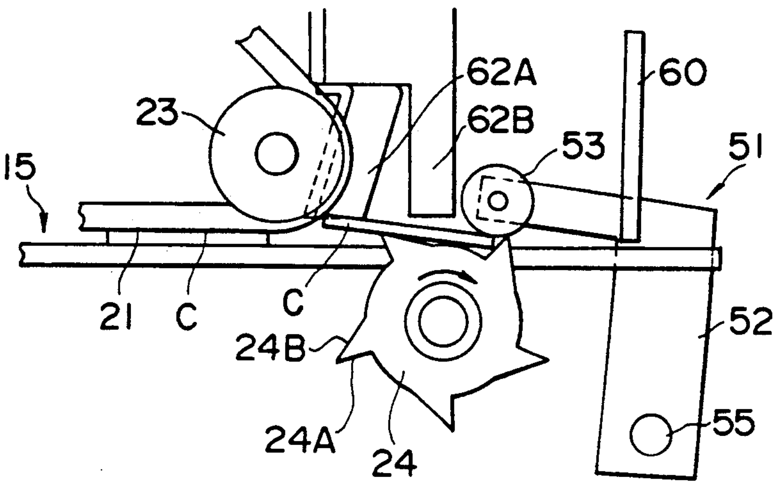
Figure 15D:
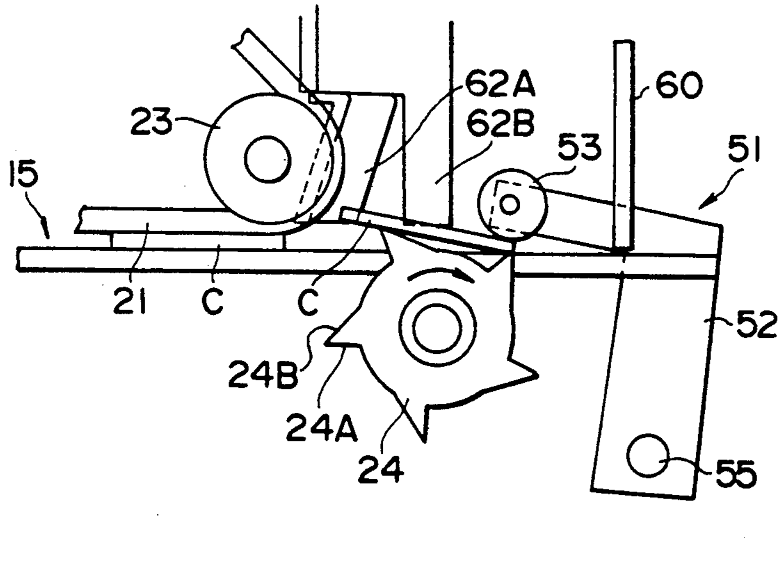
Figure 15E:
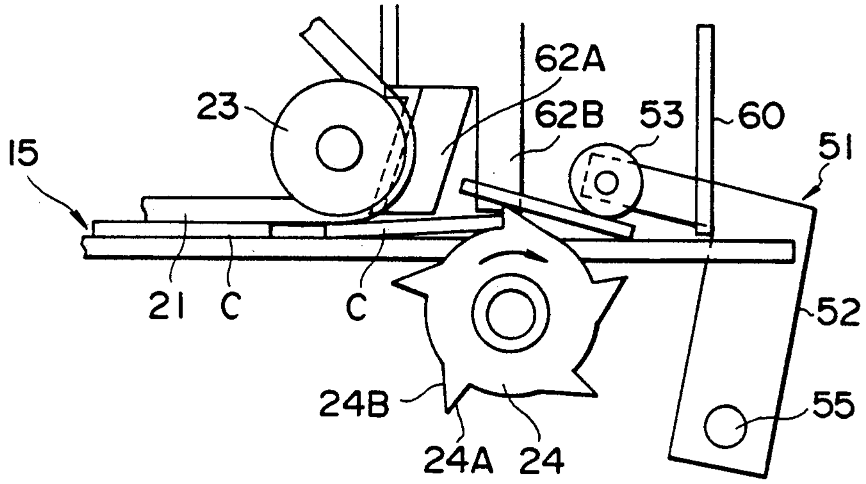
Figure 15F:
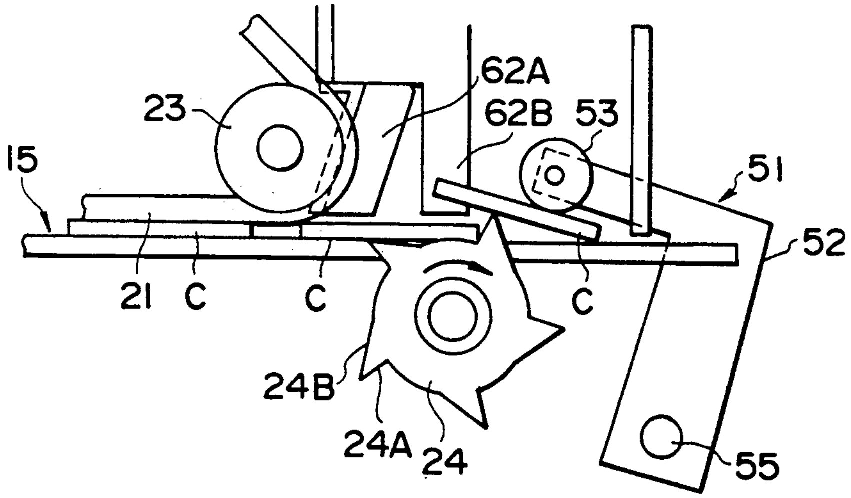
Figure 15G:
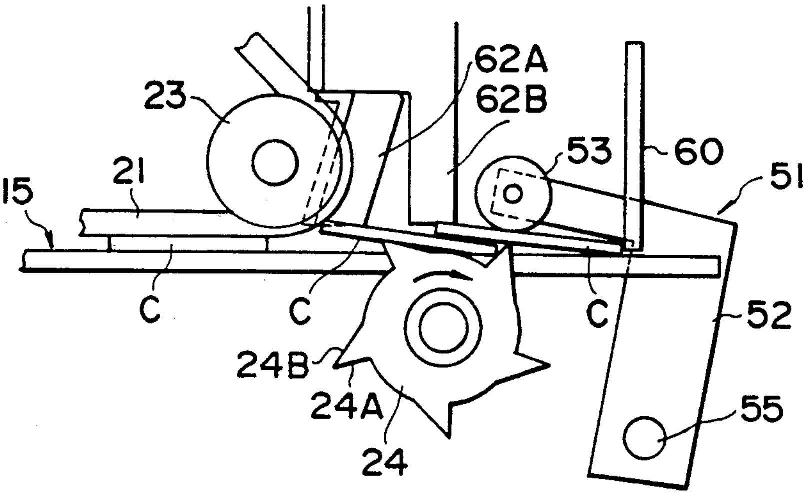
Figure 15H:
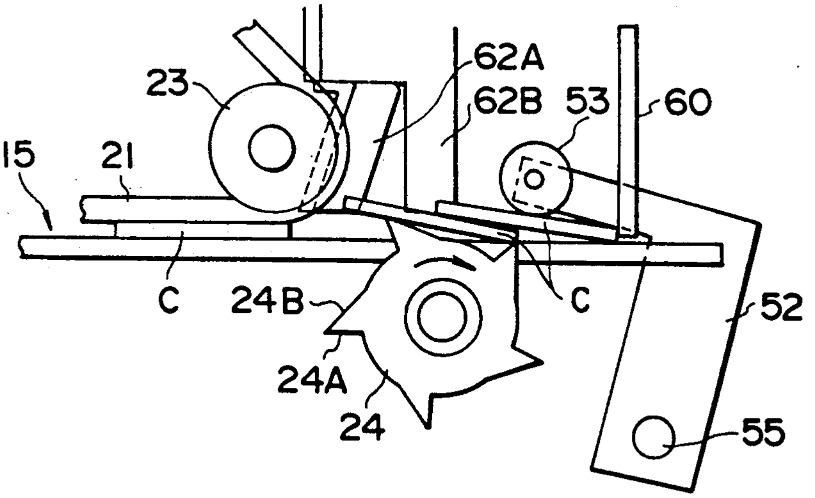
Figure 15I:
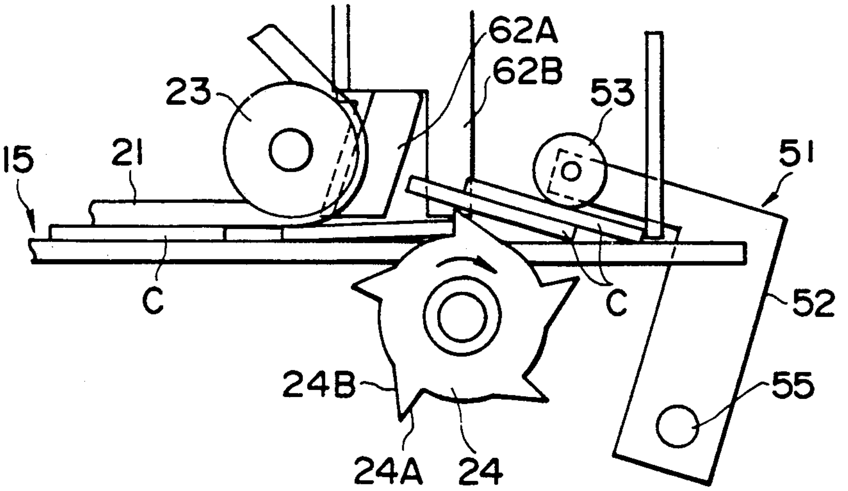
Figure 15J:
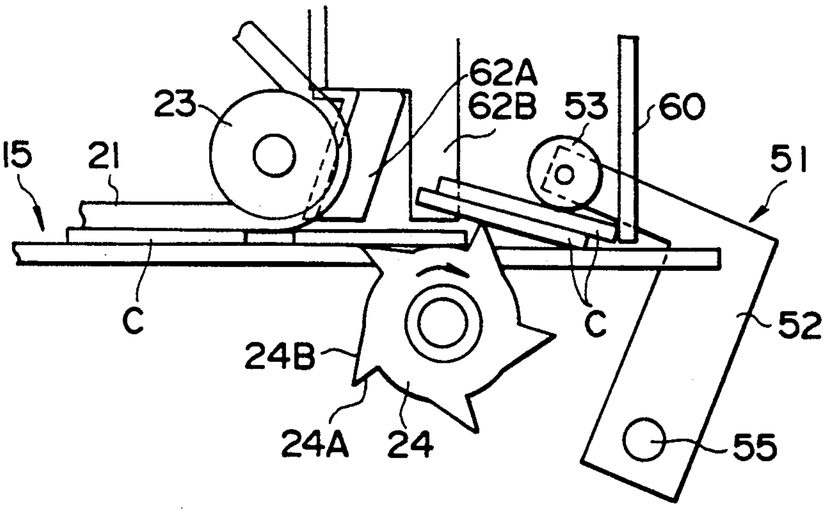

FIG. 15C shows the face of the foremost coin C subsequently riding on the coin displacement means which is made of the sloping side 24B of the next tooth (hereinafter referred to as the second tooth) of the stacking wheel 24, thus declining forwardly, as its first recited tooth raises the stabilizer roll 53 on the spring-biased lever 52. Then, as illustrated in FIGS. 15D and 15E, the foremost coin C will be caught in the slanting attitude under the stabilizer roll 53. FIG. 15E further shows the second coin coming into abutment against the nonsloping side 24A of the second tooth thereby imparting continued rotation to the stacking wheel 24 as in FIG. 15F. Then, as the foremost coin subsequently stops in engagement with the arched abutment 60, the second coin will be placed under the foremost coin, as in FIGS. 15G and 15H, and will be further fed forwardly by the stacking wheel 24 as the third coin moves into abutment against its third tooth, as in FIGS. 15I and 15J.

Figure 15K:
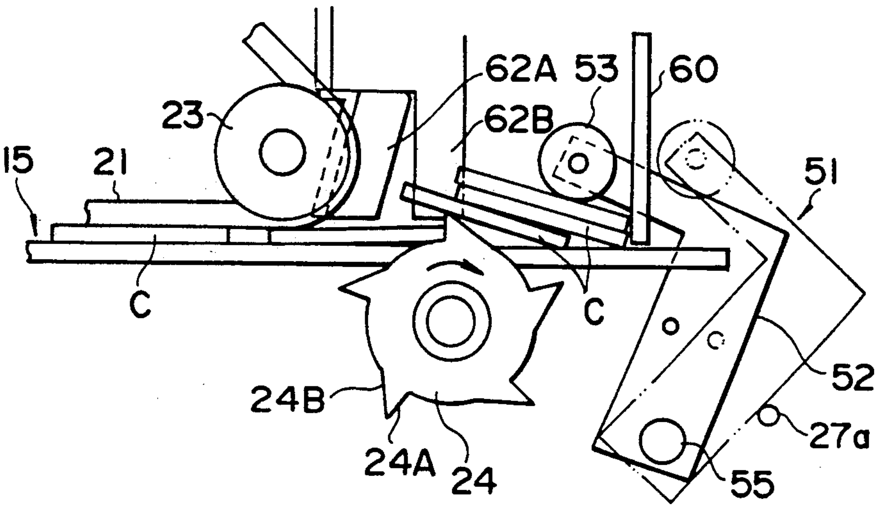
Figure 15L:
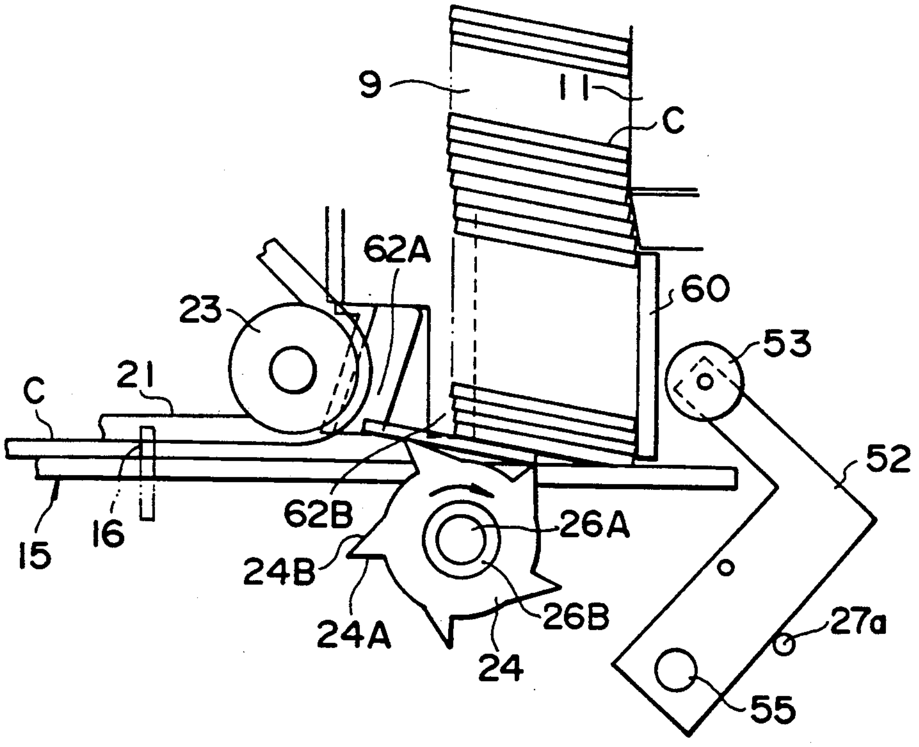

Thus the successive coins issuing from the coin guideway 15 will be stacked up in the stacking position, with each new coin placed under the preceding one on accordance with the novel concepts of the invention. When the first few, three in the illustrated embodiment, coins are stacked as in FIG. 15K, the lever 52 of the coin stabilizer mechanism 51 will be pivoted in clockwise direction by the two-way tension spring 54, FIGS. 9 and 10, with the consequent disengagement of the stabilizer roll 53 from the topmost one of the stacked coins. Thereafter, with the stacking of the additional coins, the existing stack will stand stably by virtue of its own weight, and the lever 52 will be held in engagement with the stop pin **27*a* under the force of the two-way tension spring 54. Finally, a unit number (e.g., 50) of coins will be stacked up as in FIG. 15L. It will be noted from this figure that the three wrapping rolls, only one shown here at 11**, surround greater part of the stack of coins C thus formed in the stacking position.

When the first coin sensor S1, FIGS. 1 and 3, detects the 50th coin at the exit end of the coin guideway 15, the counter 102 of FIG. 22 will respond by causing the control section 100 to energize the coin stop solenoid SD and to deenergize the turntable motor M2 and conveyor motor M3. Consequently, as the coin stopper 16 extends across the coin guideway 15 behind the 50th coin, only this last coin will revolve the stacking wheel 40 by the inertial forces of its own end of the conveyor belt 21 and so will enter below the 49th coin in the stacking position.

Possibly, however, the inertial rotation of the stacking wheel 24 may be insufficient to drive the 50th coin fully under the stack of 49 coins. It is therefore recommended that the control section 100 be programmed to energize the coin feed motor M4 for a brief time upon detection of the 50th coin by the first coin sensor S1, thereby driving the stacking wheel 24 via the one-way clutch 26B until the 50th coin comes into contact with the abutment 60 as in FIG. 15M.

Upon completion of the stacking of the 50 coins the control section 100 will set the wrapping motor $M_D$, FIG. 21, into forward rotation together with the camshaft 43. This camshaft will start revolving clockwise from its normal angular position of FIG. 17 and will complete one revolution at the end of one wrapping cycle which has just started. The following description of the wrapping cycle will be better understood by referring to the timing diagram of FIG. 23.

The rotation of the wrapping motor $M_D$ will also be transmitted to the wrapping rolls 10–12 via the belt-and-pulley arrangement depicted in FIG. 21. Further the cam 44, FIGS. 1 and 3, on the camshaft 43 will permit the swing arm 40 to be pivoted upwardly under the force of the tension spring 45 until the cam follower roll 46 on the swing arm 40 comes into abutting engagement with the contoured face 47A of the cam 47.

Figure 15M:
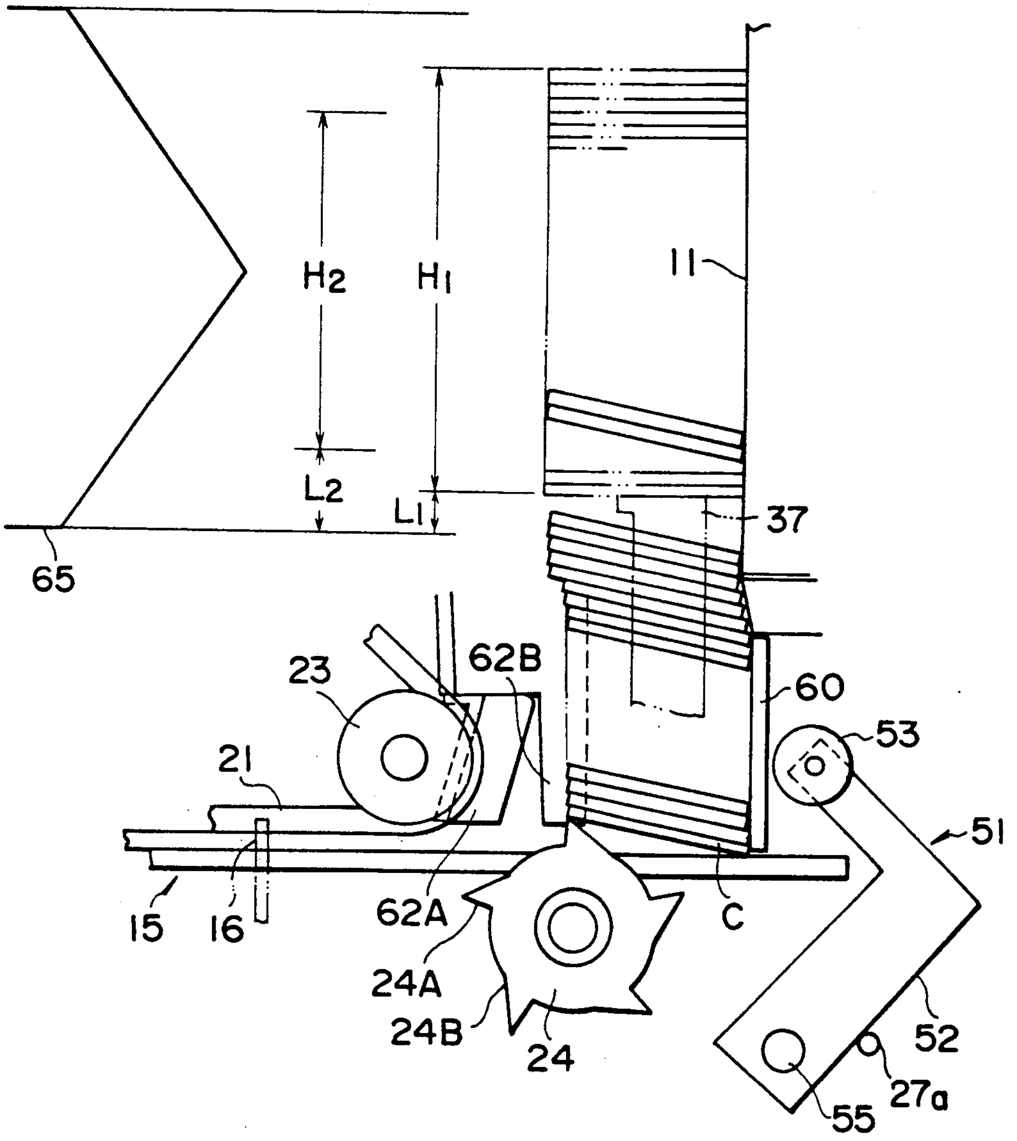
Figure 16A:
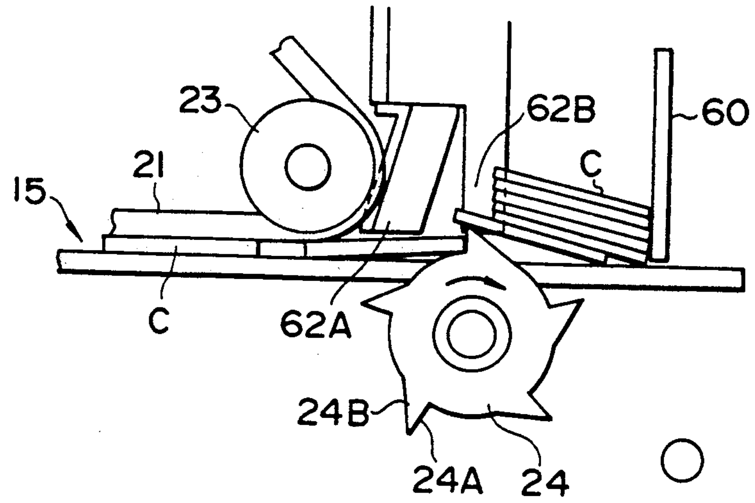
FIGS. 16A–16E are a series of elevational views explanatory of the way in which relatively small-diameter coins are stacked in the stacking position.
Figure 16B:
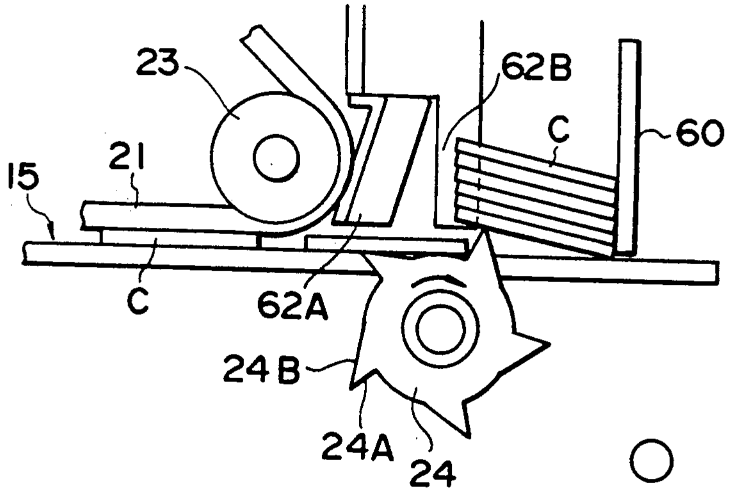
Figure 16C:
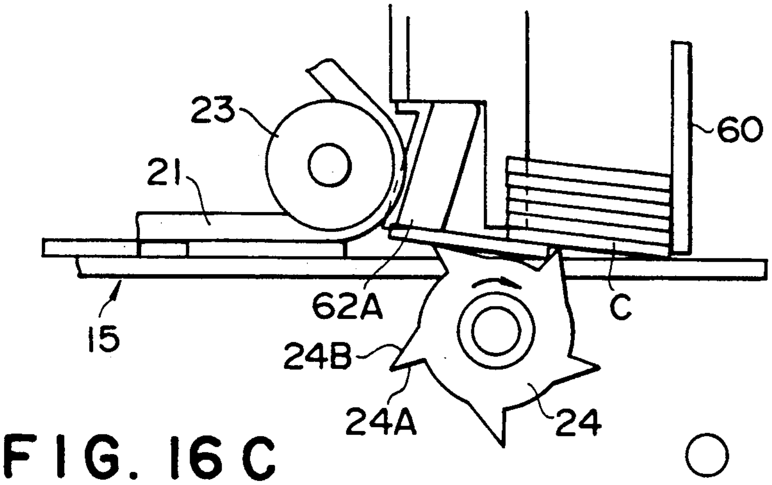
Figure 16D:
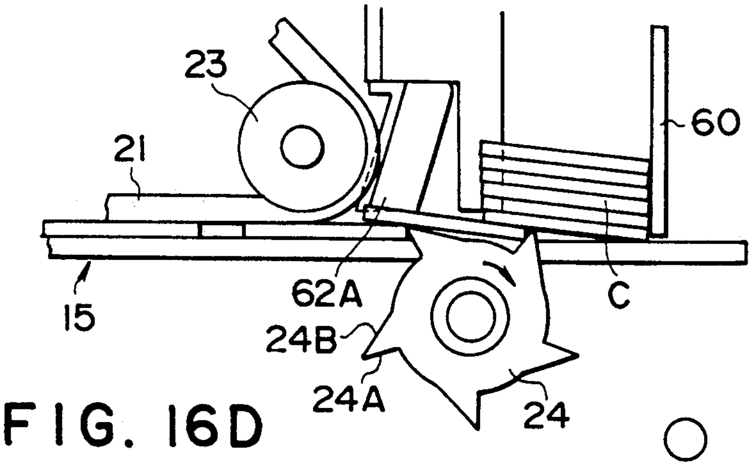
Figure 16E:
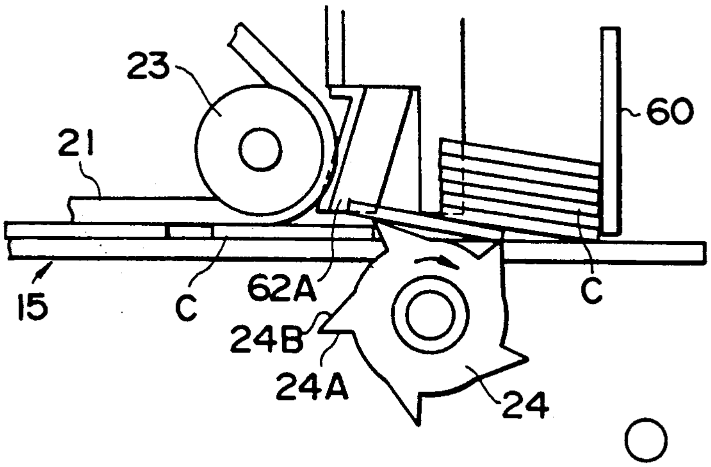

Having the fixed arm 38 overlying the roll 41 on the swing arm 40, the coin lifter 37 will travel upwardly with the above pivotal motion of the swing arm 40 thereby lifting the stack of coins C from the solid-line stacking position of FIG. 15M to the phantom wrapping position in the same drawing. As will be seen also from FIG. 15M, the stack of coins have stood aslant in the stacking position by riding on one of the teeth of the stacking wheel 24. By being raised along the adjustable-position wrapping roll 11, the stack of coins will gain the correct columnar shape and upstanding attitude in the wrapping position.

As illustrated in FIG. 17, the cam wheel 18B on the camshaft 43 has had the part J of its periphery in contact with the cam follower roll 10B on one of the swing arms 57 rotatably carrying the first wrapping roll 10 during the stacking of the coins. Immediately after the stack of coins has traveled from the stacking to the wrapping position, the peripheral part H of the cam 18B will come into contact with the cam follower roll 10B. Thereupon the first wrapping roll 10 will advance toward the other two wrapping rolls 11 and 12 thereby engaging the stack of coins C among them and frictionally imparting their forced rotation to the coin stack.

Immediately before the advancement of the first wrapping roll 10, the wrapper feed motor $M_E$, FIG. 21, will be set into rotation for driving the pair of feed rolls 67 and 68 and hence for unwinding the wrapper 65 from its roll 7. The leading end of the wrapper strip 65, which has been at a standstill in the vicinity of the third wrapping roll 12, will move toward the space between the third wrapping roll and the stack of coins C. As the first wrapping roll 10 will be advanced during this movement of the wrapper strip 65, its leading end will be caught between the third wrapping roll 12 and the coin stack and will be wound around the latter by being pulled successively past the second wrapping rolls 11, the first wrapping roll 10 and back to the third wrapping roll 12. A required unit length of the wrapper strip 65 will be cut off by the cutter blade 70 as the strip is tensioned between the stack of coins C and the pair of feed rolls 67 and 68.

The wrapper feed motor $M_E$ will be deenergized shortly after the advancement of the first wrapping roll 10. Therefore, upon severance of the unit length of the wrapper strip 65, the leading end of the wrapper strip being paid off from its roll 7 will be located at the cutter blade 70. However, as the wrapper feed motor $M_E$ is reenergized toward the end of the same wrapping cycle, the leading end of the wrapper strip will be fed to a position close to the third wrapping roll 12 and will be therein held standing by for the next wrapping cycle.

The wrapper severance sensor S7, FIG. 21, will sense the noted severance of the first unit length of wrapper strip and will deliver a signal indicative of this fact to the trouble detector section 101. Ascertaining from the input signal the cutting of the wrapper strip at the correct moment, the trouble detector section 101 will permit the control section 100 to continue the control of the various actuators for normal wrapping operation.

During the wrapping of the severed unit length of wrapper strip 65 around the stack of coins C by the wrapping rolls 10–12, the unshown cam means on the camshaft 43 will cause the pair of folding hooks 71 first to move radially with respect to the coin stack to positions over and under the same, and then to move axially with respect to the coin stack into forced engagement with its opposite ends. Thus the folding hooks 71 will fold the side edges of the wrapper strip against the ends of the coin stack.

In FIG. 23 the pair of folding hooks 71 are shown to come closest to each other upon α degrees rotation of the camshaft 43. As has been stated, however, this showing presupposes the absence of the coin stack from the wrapping position. Since the coin stack now exists in the wrapping position, the folding hooks 71 will come into engagement with its opposite ends at an earlier moment and will remain so until the unshown cam means cause them to move vertically away from the coin stack. The stack of coins has a varying height according to their denomination. The higher the stack of coins being wrapped, the earlier will the folding hooks come into engagement with its ends.

The folding hooks 71 will start traveling vertically away from the ends of the coin stack at a prescribed moment following the folding of the wrapper strip 65 against the ends of the coin stack. FIG. 23 shows the moment to be when the camshaft 43 rotates α degrees. Actually, however, the folding hooks 71 will start traveling vertically away from the coin stack at a slightly later moment because of the presence of the coin stack in the wrapping position. During such vertical displacement, and upon 270 degrees rotation of the camshaft 43, the folding hooks 71 will further start traveling horizontally back to their initial positions.

In the course of the above folding of the wrapper strip against the ends of the coin stack by the folding hooks 71, the cam 44 on the camshaft 43 will act on the swing arm 40, FIGS. 1 and 3, to cause the descent of the coin lifter 37 from the wrapping to the stacking position. Then, shortly after the descent of the coin lifter 37, the control section 100 will set the eject motor M1, FIGS. 4, 9 and 10, into rotation. The eject motor M1 will move the carriage 27 from the phantom working position of FIG. 4 to the solid-line retracted position via the crank arm 35 and link 36. Thereupon, as illustrated in FIG. 3, the chute 56 will be exposed under the wrapping rolls 10–12.

Immediately thereafter, as the cam follower roll 10B rides on the peripheral part K of the cam wheel 18B on the camshaft 43, the first wrapping roll 10 will retract away from the other wrapping rolls 11 and 12 thereby releasing the wrapped stack of coins and allowing the same to fall by gravity into and through the chute 56 into the receptacle 5, FIG. 2, on the front side of the machine. Then the eject motor M1 will be reenergized to return the carriage 27 to the working position. As illustrated in FIGS. 5A–5C, the link 36 will act on the coin stabilizer 51 during the return stroke of the carriage 27 so that the stabilizer roll 53 will come to rest on the coin lifter 37 under the bias of the tension spring 54. Also, approximately concurrently with the above reenergization of the eject motor M1, the cam follower roll 10B will ride on the peripheral part J of the cam wheel 18B to cause the first wrapping roll 10 to travel closer to the other wrapping rolls 11 and 12.

Then, completing a revolution, the camshaft 43 will return to the normal angular position. One wrapping cycle will be completed as the control section 100 sets the wrapping motor $M_D$ out of rotation. The same cycle of operation will be repeated as long as there is an additional supply of coins to be stacked and wrapped. The next cycle of stacking and wrapping will start through the following procedure.

Upon return of the carriage 27 to the working position the carriage sensor S3′ will deliver to the trouble detector section 101 a signal representative of that fact. The camshaft angle detector section 103 will also deliver to the trouble detector section 101 a signal indicative of the subsequent return of the camshaft 43 to its normal angular position. Then, provided that the carriage 27 has returned to its working position at the correct moment immediately preceding the moment the camshaft 43 completes a revolution, the trouble detector section 10 will permit the control section 100 to reset the turntable motor M2 and conveyor motor M3 into rotation and to deenergize the coin stop solenoid SD. The delivery of another unit number of coins to the stacking position is now commenced.

The operation of the illustrated coin stacking and wrapping apparatus has so far been described on the assumption that no trouble occurs throughout the complete cycle of stacking and wrapping operation. As long as no trouble occurs, the control section 100 will respond to the output signals of the control board 3, trouble detector section 101 and counter section 102 by setting the motors M1–M4, $M_C$, $M_D$ and $M_E$ and solenoid SD into and out of operation at the prescribed moments. Each unit number of coins will thus be stacked and wrapped in the normal manner.

The wrapper strip 65 is used for wrapping stacks of coins of various denominations and, in consequence, of various heights. Therefore, as illustrated in FIG. 15M, the height of the wrapping position is adjustably varied with respect to the fixed vertical position of the wrapper strip 65 in accordance with the height of the coin stack to be wrapped. The height of the wrapping position is variable, of course, by raising the coin lifter 37 to a different height according to the denomination of the coins being handled. The height H1 of the coin stack shown in FIG. 15M is relatively great, so that the coin lifter 37 is raised a correspondingly small distance L1 above the plane of the platform 8, FIG. 1, on which the wrapper roll 7 is mounted. For wrapping a coin stack of a smaller height H2, the coin lifter 37 may be raised a greater distance L2 above the plane of the platform 8.

The coin lifter 37 can be raised to such varying heights as the angle through which the swing arm 40, FIG. 1, is pivoted upwardly is varied by the contoured face 47A of the cam wheel 47. The cam face 47A may therefore be contoured to permit such displacement of the coin lifter 37 to the prescribed different heights according to the various denominations of coins to be handled by the machine. However, the coin lifter 37 may not necessarily be raised to a different height for each of the various denominations of coins. Although these various denominations of coins may all be stacked to different heights, they may be classified into, say, three groups consisting of the high group, the medium height group and the low group. The coin lifter 37 may be raised to either of three different vertical positions depending upon the group to which belongs the denomination of the coins to be wrapped.

Usually, different denominations of coins have different diameters, and the difference between the largest and the smallest may be substantial. The illustrated apparatus is well calculated for neatly stacking and wrapping such different diameters of coins without the need for any alteration of its constituent parts.

FIGS. 15A–15M have been drawn on the assumption that the coins C being stacked are of a relatively large diameter. As will be understood from FIG. 15A, 15E, 15I or 15K, each coin on coming into abutment against a tooth of the stacking wheel 24 is still frictionally engaged by the conveyor belt 21. Thus the coin can drive the stacking wheel under the force of the conveyor belt 21. For the stacking of smaller-diameter coins, however, the second wrapping roll 11 will come closer to the stacking position as in FIG. 13. Further, as illustrated in FIGS. 16A–16E, each smaller-diameter coin C will drive the stacking wheel 24 by inertia on being released from under the conveyor belt 21.

Figure 12:
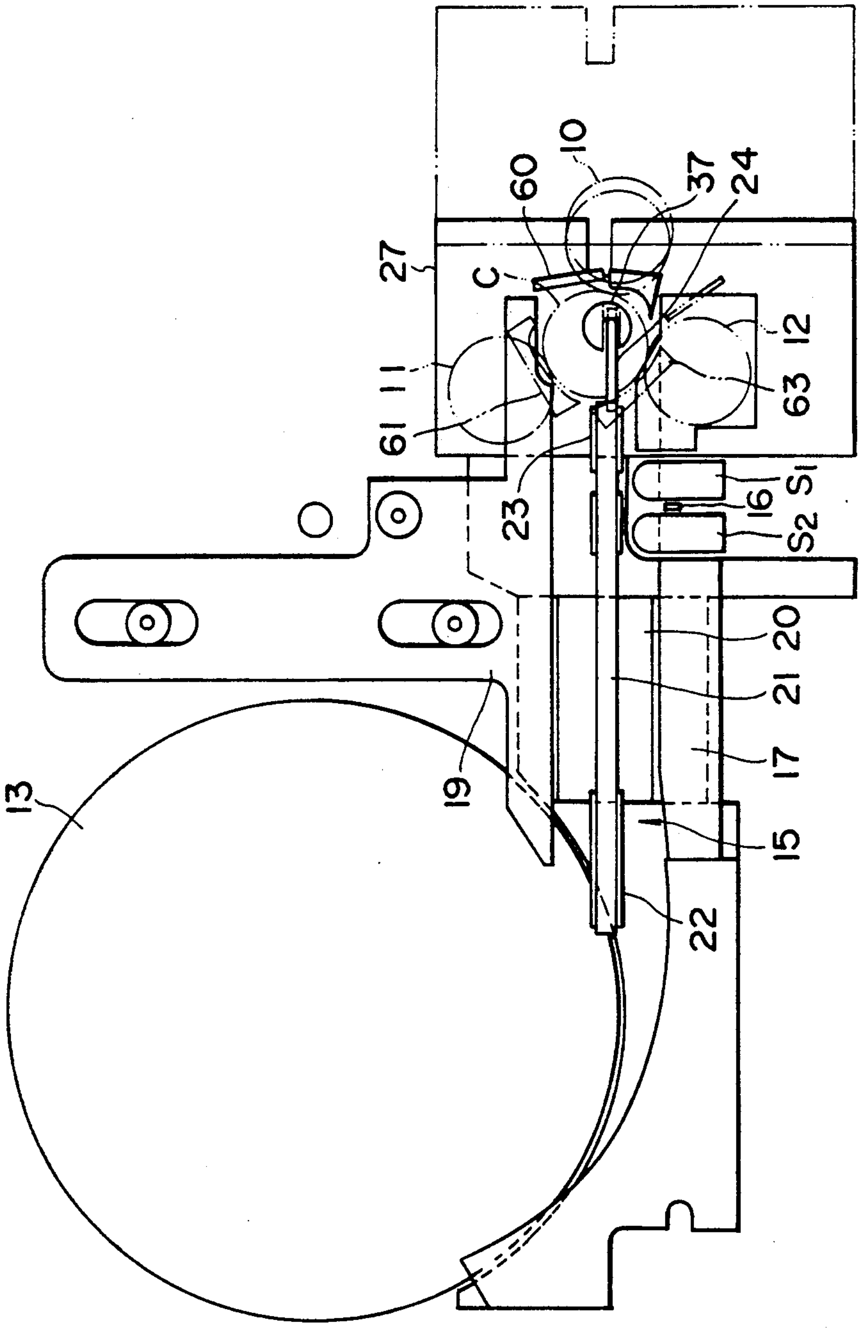
FIG. 12 is a view similar to FIG. 11 but explanatory of the relative positions of the wrapping rolls during the wrapping of the large-diameter coins.
Figure 14:
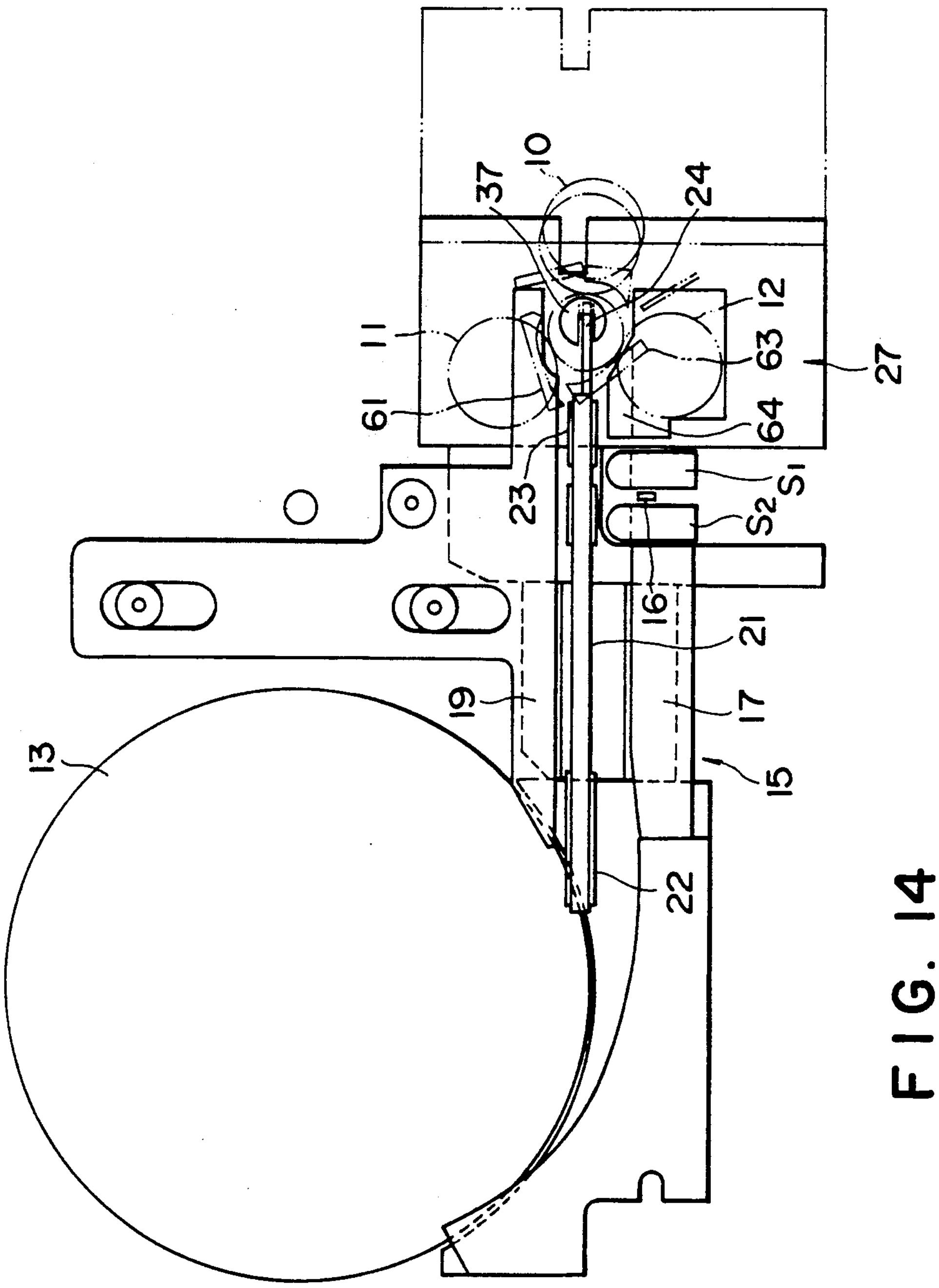
FIG. 14 is also a view similar to FIG. 11 but explanatory of the relative positions of the wrapping rolls during the wrapping of the small-diameter coins.
Figure 20:
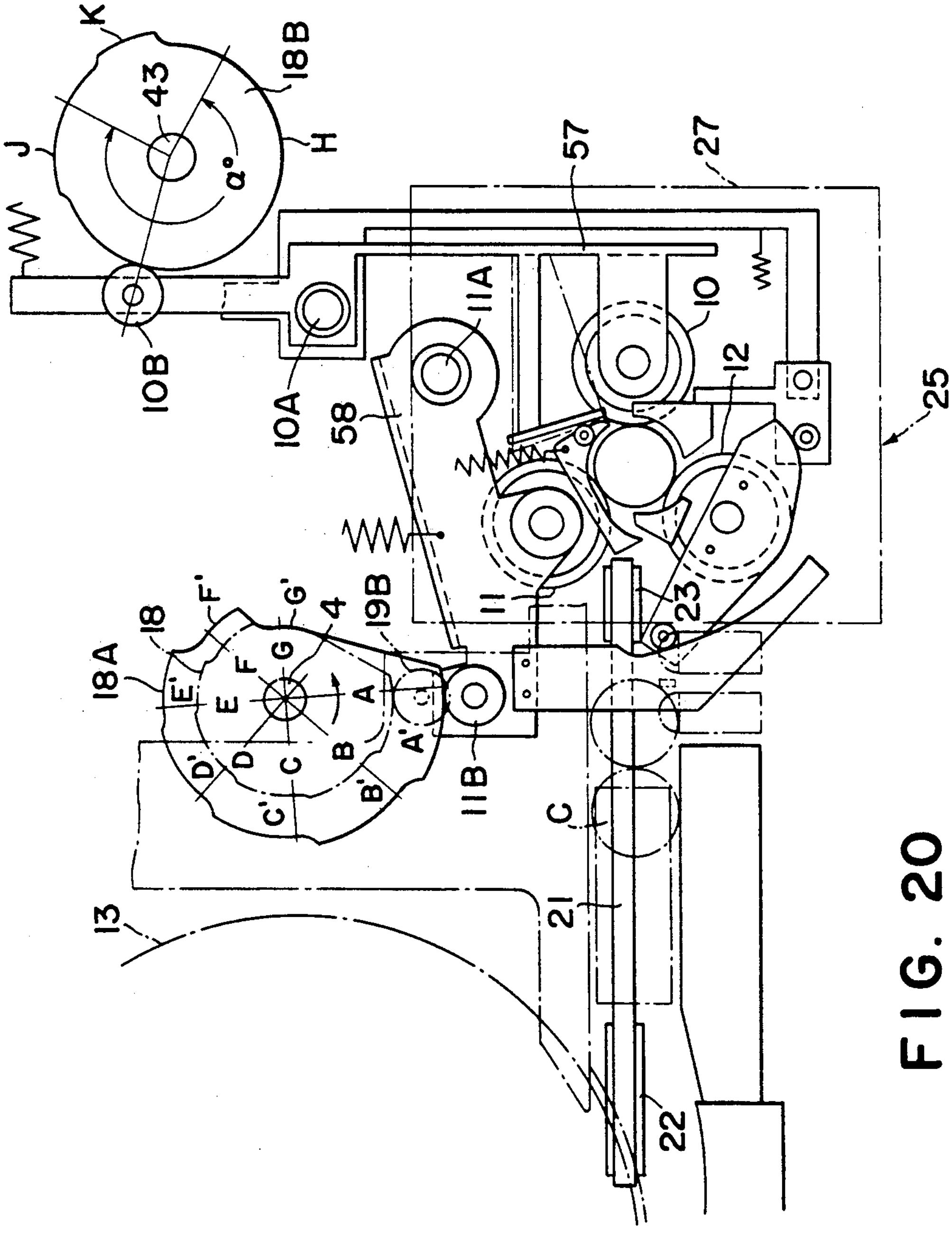
FIG. 20 is a top plan similar to FIG. 17 but showing the wrapping rolls in rotation with the stack of coins.

Stacks of different diameter coins can be wrapped in the same way except for the movement of the first wrapping roll 10 during the wrapping operation. The first wrapping roll 10 will move as shown in FIG. 12 for pressing a stack of larger-diameter coins against the other two wrapping rolls 11 and 12, and as shown in FIGS. 14 and 20 for pressing a stack of smaller-diameter coins against the rolls 11 and 12.

The illustrated apparatus lends itself to only the counting of coins, without either stacking or wrapping them. For this purpose the operator may first set the machine in the counting mode, as by the depression of the mode select switch button on the control board 3, and further choose, as by the depression of digit keys on the control board, one of the preset numbers (e.g., 1000, 2000, 2500, 4000 and infinity) up to which the counter 102 may count the coins. Further the operator may input at the control board 3 the desired denomination of coins to be counted, with the result that the width of the coin guideway 15 is automatically adjusted to the diameter of the coins.

Now the operator may proceed to actuate the start switch button on the control board 3. In response to the start signal thus supplied, and to the output from the carriage sensor 83 indicative of the retraction of the carriage 27, the control section 100 will set both the turntable motor M2 and the conveyor motor M3 into rotation. Aligned on the turntable 13, the coins will be counted by the coin sensors S1 and S2 while being subsequently fed over the guideway 15. Since the carriage 27 is now held retracted, the counted coins will be ejected through the chute 56. When the coin sensors S1 and S2 count the coins up to the preselected number, the counter 102 will cause the control section 100 to discontinue the rotation of the turntable motor M2 and conveyor motor M3. The control section 100 will also actuate the coin stop solenoid SD to stop the following coins on the guideway 15. The counting of the additional coins will be recommenced by actuation of the start button on the control board 3.

The following is a discussion of the machine operation in the event of troubles during counting and stacking and of troubles during wrapping. Various troubles taking place during counting and stacking have already been set forth, and it has also been mentioned that the trouble detector section 101 delivers a stacking trouble signal to the control section 100 when any of the listed troubles is detected. In response to the stacking trouble signal the control section 100 will immediately suspend the rotation of the turntable motor M2 and the conveyor motor M3 and deenergize the coin stop solenoid SD if it has been energized.

The operator may actuate the reset switch button on the control board 3 for the resumption of machine operation. The control section 100 will respond to the incoming reset signal, provided that the stacking trouble signal has also been input from the trouble detector section 101, by taking the following three troubleshooting steps for restoring the machine to normal operation:

1. The turntable motor M2 and the conveyor motor M3 are set in reverse rotation for driving the turntable 13 and conveyor belt 21 in the reverse direction for a prescribed period of time. The coin stopper 16, if it has been advanced, is retracted.

2. The coin select motor $M_C$ is energized for maximum retraction of the second wrapping roll 11 and the provision of the maximum spacing between the guides 17 and 19 of the coin guideway 15.

3. With the stacking wheel 24 maintained in forward rotation by the energization of the coin feed motor M4, the carriage 27 is retracted to the FIG. 3 position by the energization of the eject motor M1.

Now the machine is ready to be restarted, although the carriage 27 is still retracted. The coins will have been returned from the guideway 15 to the turntable 13, and the coins that were stacked either poorly or correctly in the stacking position will have been all ejected through the chute 56, by the foregoing three troubleshooting steps. If then the start switch button is actuated, the control section 100 will first respond by energizing the eject motor M1 for advancing the carriage 27 to its working position. Upon detection of this carriage advancement by the carriage sensor S3' the control section 100 will proceed to set both the turntable motor M2 and the conveyor motor M3 into rotation for the recommencement of stacking and wrapping operation.

Figure 18:
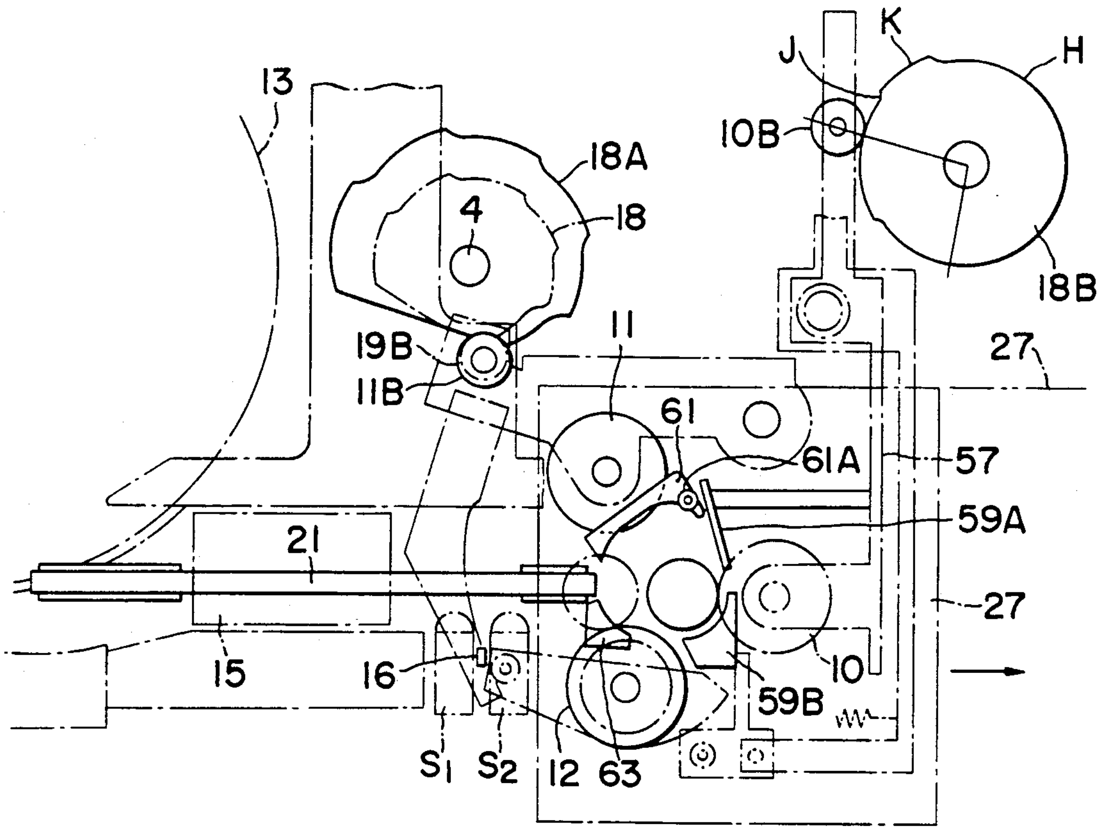
FIG. 18 is a view similar to FIG. 17 but showing the wrapping means in the state when the jamming of the coins during stacking is overcome.

The above second troubleshooting step the maximum retraction of the second wrapping roll 11 and the maximization of the space 20, FIG. 3, between the guides 17 and 19 of the coin guideway 15, may be in need of elaboration. When the minimum diameter coins are being stacked as shown in FIG. 17, the second wrapping roll 11 is held in the corresponding position by the cam wheel 18A on the coin select shaft 4 as the cam follower roll 11B rides on its peripheral part A'. Upon rotation of the coin select motor $M_C$ in accordance with the second troubleshooting step, the cam follower roll 11B will ride on the peripheral part G' of the cam wheel 18A, as illustrated in FIG. 18, resulting in the maximum retraction of the second wrapping roll 11 together with the wrapper guide 61. Further, as the other cam wheel 18 on the coin select shaft 4 also rotates to the same angular position, the associated cam follower roll 19B will ride on its peripheral part G, with the consequent maximum retraction of the movable guide 19 of the coin guideway 15 away from the fixed guide 17. The wrapper guide 64 will also move in a direction away from the first wrapping roll 10. All the coins will be thus released which have been caught between any two or more of the wrapping rolls 10–12, wrapper guides 59A, 59B, 61 and 63, stacking wheel 24, coin guides 62A, 62B and 64, and coin abutment 60.

The control section 100 may be programmed to execute the listed three troubleshooting steps either in response to the manual reset signal from the control board 3, as in the foregoing disclosure, or automatically following the deenergization of the motors M2 and M3 and, as required, of the solenoid SD. An alarm system may be incorporated in the machine if it is constructed to automatically detect and overcome troubles, in order to indicate, either audibly and/or visibly, that trouble has happened and is being remedied.

Also, the carriage 27 may be retracted during, rather than after, the retraction of the wrapping roll 11. The control section 100 will cause the coin feed motor M4 to drive the stacking wheel 24 during such retraction of the carriage 27, as pictured in FIG. 19, thereby assuring the ejection of the coins without the risk of jamming.

How the various possible troubles during the subsequent wrapping operation are detected, and how their causes are ascertained, have already been set forth by classifying such wrapping troubles into five categories. In the event of all the noted wrapping troubles, as ascertained from the outputs from the various sensors S1–S7, the trouble detector section 101 will deliver to the control section 100 signals suggestive of the deenergization of the wrapper feed motor $M_E$ and the eject motor M1. These motors will be immediately deenergized if they have been in prescribed periods of rotation but actually have been either out of rotation or in rotation at reduced speed. On the other hand, if the motors $M_E$ and M1 have not been in prescribed periods of rotation and have been standing by for later periods of rotation, they will be maintained out of rotation even when such periods of rotation come.

As has been stated, the wrapping motor $M_D$ driving the camshaft 43 is reversed in rotation when some wrapping trouble occurs before the camshaft rotates through the above defined angle $\alpha$, FIG. 23, from its normal angular position. In response to the trouble detector output signal dictating the reversed rotation of the wrapping motor $M_D$, the control section 100 will bring the wrapping motor to a momentary stop and then set it into reversed rotation together with the camshaft 43. The subsequent return of the camshaft 43 to its normal angular position will be ascertained by the camshaft angle detector section 103 whereupon the control section 100 will set the wrapping motor $M_D$ out of reversed rotation.

Possibly, during such reversed rotation, the wrapping motor $M_D$ and camshaft 43 may come to a premature standstill, or their speed of rotation may drop, by some accident. Such trouble will be detected by the trouble detector section 101 on the bases of the signal from either the wrapping motor rotation sensor S5 or the camshaft rotation sensor S6 and of the signal from the camshaft angle detector section 103. The trouble detector section 101 will then proceed to cause the control section 100 to immediately deenergize the wrapping motor $M_D$.

The automatic return of the camshaft 43 to its normal angular position by reversed rotation serves to prevent from growing worse the wrapping trouble that has happened before the camshaft rotates $\alpha$ degrees in each wrapping cycle. This statement is particularly true in the event where the wrapping trouble has occurred when the stack of coins is engaged among the three wrapping rolls 10–12 as shown in FIG. 20. Then, upon rotation of the camshaft 43 in the reverse direction (counterclockwise as viewed in FIG. 20), the cam follower roll 10B will ride onto the peripheral part J of the cam wheel 18B on the camshaft thereby causing the first cam follower roll 10 to move away from the other two wrapping rolls 11 and 12. The coins that have jammed among the wrapping rolls 10–12 will thus be released.

A reference to FIG. 21 again will show that the wrapping motor $M_D$ drives not only the camshaft 43 but also the wrapping rolls 10–12. Therefore, since these wrapping rolls are also driven in the reverse direction together with the camshaft 43, the wrapper strip 65 which may have jammed between the wrapping rolls and the various wrapper guides will also become free or at least become easier to manually remove.

Wrapping trouble may occur when the stack of coins is being revolved by the three wrapping rolls 10–12 and, at the same time, when the pair of folding hooks 71 are traveling vertically toward the opposite ends of the coin stack after traveling horizontally from their retracted position. In that case, with the reversed rotation of the camshaft 43, the folding hooks 71 will travel vertically away from each other and further horizontally away from the stack of coins without interfering therewith. Neither the folding hooks 71 nor other neighboring parts of the machine will be ruined by such retraction of the folding hooks.

Also, with the reversed rotation of the camshaft 43, the coin lifter 37 which has raised the coin stack from the stacking to the wrapping position will descend without being impeded by the coin stack being engaged by the wrapping rolls 10–12. During the progress of normal wrapping operation, the coin lifter 37 is timed to start descending from the wrapping to the stacking position just before the camshaft rotates $\alpha$ degrees in the forward direction, as indicated in FIG. 23. If trouble occurs during such an early part of the descent of the coin lifter 37, the reversed rotation of the camshaft 43 will result in the ascent of the coin lifter back toward the wrapping position. This ascent of the coin lifter 37 might seem undesirable because of the possible interference with the coins that have been being wrapped in the wrapping position. No serious interference will occur, however, first because the coin lifter 37 will ascend a very short distance back to the wrapping position and secondly because the coins, if somewhat disarranged, will nevertheless be mostly engaged and retained in position by the wrapping rolls 10–12. Of course, the coin lifter 37 will not ascend, but will continue to descend, when trouble occurs after the $\alpha$ degrees rotation of the camshaft 43, since then the camshaft will remain in forward rotation for returning to its normal angular position.

It is now clear that the return of the camshaft 43 to its normal angular position by the reversal of its revolving direction serves to mitigate, or at least to prevent the worsening of, a variety of wrapping troubles taking place before the α degrees rotation of the camshaft in the forward direction in each wrapping cycle. The camshaft 43 may either stop or slow down during its reversed rotation. In that case the camshaft 43 will be automatically set out of rotation thereby terminating any further progress of the wrapping trouble and protecting the associated machine parts from destruction.

Upon detection of any of the mentioned wrapping troubles when the output from the camshaft angle detector section 103 indicates not less than α degrees of rotation of the camshaft 43, the trouble detector section 101 will deliver to the control section 100 a signal dictating continued forward rotation of the wrapping motor $M_D$ and hence of the camshaft 43. The control section 100 will terminate the continued forward rotation of the wrapping motor $M_D$ when the camshaft angle detector section 103 detects the return of the camshaft to its normal angular position.

Possibly, as in the case of the reversed rotation, the camshaft 43 or both the camshaft and the wrapping motor $M_D$ may stop or slow down during the continued forward rotation. The trouble detector section 101 will detect such trouble from the outputs from the wrapping motor rotation sensor S5 or the camshaft rotation sensor S6 and from the camshaft angle detector section 103. In response to the resulting output from the trouble detector section 101 the control section 100 will immediately set the wrapping motor $M_D$ out of the continued forward rotation.

Wrapping troubles taking place during the forward rotation of the camshaft 43 between the positions of α and 360 are as follows:

1. Troubles detected by the carriage sensors S3 and S3':

The wrapped coins on ejection may be caught between the carriage 27 and the exit end plate 15B, FIG. 3, of the coin guideway 15, or dust or other foreign matter may lock the carriage against retraction, thereby jamming the eject motor M1.

2. Troubles detected by the wrapper feed motor rotation sensor S4:

The pair of wrapper feed rollers 67 and 68 may fail to feed the wrapper strip 65 for the second time in each wrapping cycle.

3. Troubles detected by the wrapping motor rotation sensor S5 and camshaft rotation sensor S6:

Either the wrapping motor $M_D$ itself or the wrapping mechanism itself may malfunction.

All these troubles but those detected by the wrapping motor rotation sensors S5 and camshaft rotation sensor S6 do not prevent the continued forward rotation of the camshaft 43. Therefore, after the return of the camshaft 43 to its normal angular position, the causes of the trouble may be easily removed manually, there being no need for manually revolving the camshaft back to the start position unlike the case heretofore.

The same advantages will be gained in connection with the troubles concerning the rotation sensors S5 and S6, only if the camshaft 43 can be initialized by the continued forward rotation. Moreover, even if the camshaft 43 is incapable of continued forward rotation, the wrapping motor $M_D$ will be deenergized immediately, so that the trouble with the wrapping motor itself or the wrapping mechanism itself will not grow worse.

It will be recalled that the eject motor M1 as well as the wrapper feed motor $M_E$ has been held out of rotation, with the carriage 27 held in the working position of FIG. 1, ever since any of the wrapping troubles has been detected during one complete revolution of the camshaft 43. Thus, following the return of the camshaft 43 to the normal position by either the reversal or continuation of its forward rotation, or following the premature stop of the camshaft during its return to the normal position, the operator may activate the reset switch button on the control board 3 thereby causing the control section 100 to set the eject motor M1 into rotation. The coins that have been trapped in the wrapping position or thereabouts will fall into the chute 56 and so will be ejected with the retraction of the carriage 27.

Figure 19:
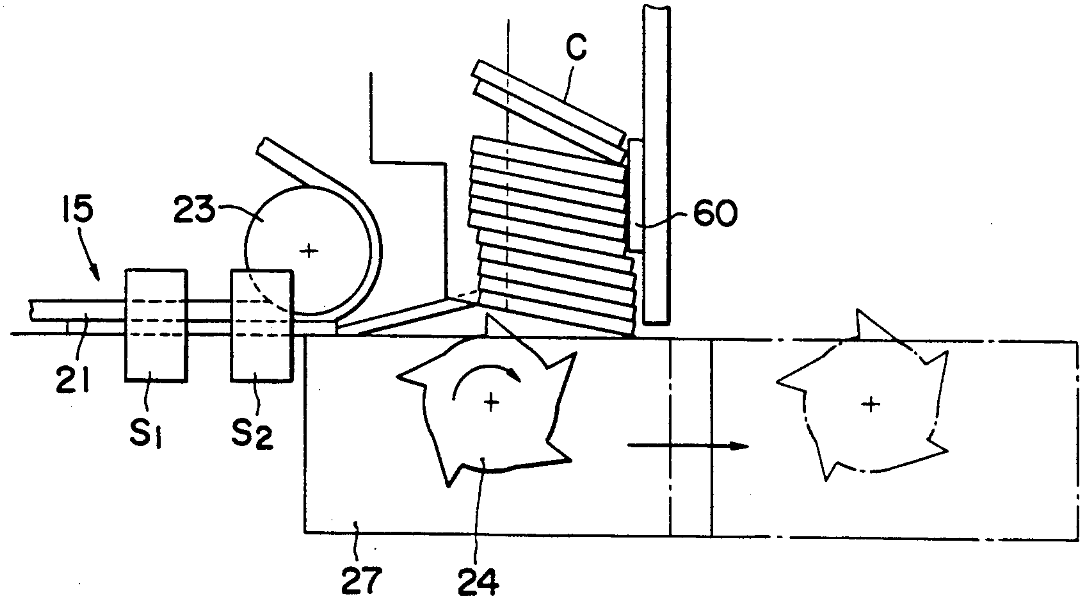
FIG. 19 is a elevational view showing the retraction of the carriage from the wrapping position.

During such retraction of the carriage 27 the control section 100 will energize the coin feed motor M4, as has been mentioned with reference to FIG. 19. The consequent forced rotation of the stacking wheel 24 will enable the retraction of the carriage 27, and the ejection of the coins, without giving rise to the fresh jamming of the coins.

Now the operator may proceed to eliminate the cause of the wrapping trouble, as by manually removing the jamming coins or wrapper strip. After making sure that he has properly dealt with the trouble, the operator may activate the start switch button on the control board 3. The control section 100 will respond by first setting the eject motor M1 into rotation, resulting in the advancement of the carriage 27 to the working position. Upon detection of this advancement of the carriage 27 by the carriage sensor S3' the control section 100 will recommence the rotation of the turntable motor M2 and the conveyor motor M3 and further deenergize the coin stop solenoid SD for retracting the coin stopper 16. A new cycle of coin stacking and wrapping operation has now started.

Figure 24:
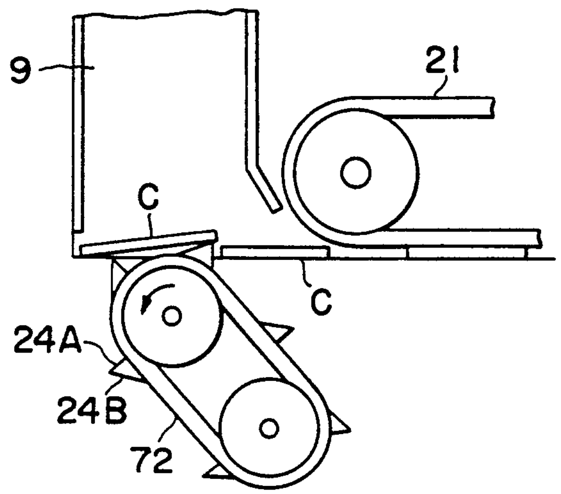
FIG. 24 is a side elevation of alternative coin stacking means.

It is to be noted that the toothed stacking wheel 24 used in the foregoing embodiment represents but one of many like means for stacking a unit number of coins by placing each new coin under the preceding one. FIG. 24 shows another preferable example of such stacking means, which takes the form of an endless belt 72 operating over a pair of pulleys. These pulleys rotate about fixed horizontal axes which are spaced at least vertically from each other and which are both disposed under the plane of the coin guideway 15. The endless belt 72 has formed thereon a series of spaced-apart ratchet teeth each having a nonsloping side 24A and a sloping side 24B. The ratchet teeth protrude above the plane of the coin guideway 15 while traveling over one of the pulleys. It is apparent that, although formed on the endless belt 72 instead of on a wheel, the ratchet teeth perform the same functions as those of the preceding embodiment.

Figure 25:
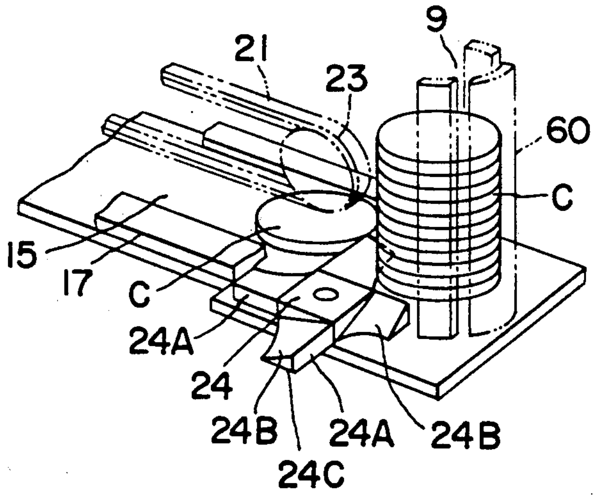
FIG. 25 is a perspective view of second alternative coin stacking means.

It is not essential that the toothed stacking member rotate in a vertical plane as in the two foregoing embodiments. Thus, according to still another preferable example of stacking means shown in FIG. 25, the stacking wheel 24 is mounted adjacent the exit end of the coin guideway 15 for rotation in a horizontal plane. The stacking wheel 24 has a plurality of, four in this embodiment, spokes or teeth 24C each having a nonsloping side 24A and a sloping side 24B. The operation of this second alternative stacking wheel is also considered self-evident from the foregoing description of the first disclosed stacking wheel.

Despite the foregoing detailed disclosure it is not desired that the invention be limited by the exact details of the illustrated embodiments. The following, then, is a brief list of possible modifications or alterations of the foregoing embodiments which are believed to fall within the scope of the invention:

1. The coins may be fed over the coin guideway 15 by conveyor rolls instead of by the conveyor belt 21.

2. The coin guideway 15 may be inclined and/or bent instead of being horizontal and rectilinear.

3. The carriage 27 may be normally held in the working position of FIG. 1 instead of in the retracted position of FIG. 3.

4. The stacking position need not be in the immediate vicinity of the exit end of the coin guideway 15 only if the coins can be stacked by placing each new coin under the existing stack.

5. The stack of coins being wrapped in the wrapping position need not be supported by the coin lifter 37 until immediately before the folding of the wrapper strip against the ends of the stack by the pair of folding hooks 71; instead, the coin lifter may be lowered out of supporting engagement with the coin stack at an earlier moment, the stack of coins being supported in position by the wrapping rolls 10–12.

6. The stacking wheel 24 or equivalent means may be motor-driven not only for feeding the last of each unit number of coins, as in the first described embodiment, but whenever the coins have ceased to travel smoothly.

7. The coin sensors S1 and S2 for counting the coins being delivered to the stacking position may not be used for detecting a failure in stacking the coins. Additional sensors may be provided exclusively for the latter purpose.

This stacking apparatus has been described in combination with a particular type of integral wrapping device. As noted in the specification, the coin lifter 37 moves the coins from a stacking position to a vertically displaced wrapping station, as shown in FIG. 15M. Thus, other suitable wrapping devices may be used without departing from the spirit and scope of invention, as defined in the appended claims.

We claim:

1. A coin stacking apparatus comprising conveyor means for transporting coins in a row along a coin guideway leading to a coin stacking position below a vertical coin stacking space, and means for stacking the coins at said coin stacking position into the coin stacking space, said means for stacking the coins comprising:

movable means having a plurality of coin engagement means to be abutted upon by leading ends of respective coins issuing successively from said coin guideway to said coin stacking position;

a plurality of coin displacement means disposed for contacting a face of each of the coins at a trailing end of each coin to push and displace the coin into said coin stacking space when a succeeding coin abuts against the succeeding coin engagement means to move said movable means;

said coin engagement means and said coin displacement means being arranged alternately on said movable means and being moved alternately into and out of said coin stacking space;

said movable means being a stacking wheel rotatable about a horizontal axis and having a series of teeth formed circumferentially thereon, said coin engagement means being one side of the teeth and said coin displacement means being the other side of the teeth; and coin stabilizer means coacting with the stacking wheel for stacking the coins in the stacking position in stable manner by exerting a downward pressure on the coins during the stacking of some number of coins, said coin stabilizer means comprising:

(a) a lever pivotable in a vertical plane;

(b) a stabilizer roll rotatably mounted to the lever; and (c) two-way spring means acting on the lever for exerting a downward pressure on the coins being stacked in the coin stacking position via the stabilizer roll and, when a prescribed number of coins are stacked, for pivoting the lever away from the stack of coins.

2. The coin stacking apparatus as claimed in claim 1, wherein said one sides of the teeth are nonsloping sides and said other sides of the teeth are sloping sides.

3. The coin stacking apparatus as claimed in claim 1, further comprising drive means for forcibly driving the coin stacking wheel as required.

4. The coin stacking apparatus as claimed in claim 1, further comprising an abutment disposed contiguous to the coin stacking position and opposite the coin guideway, the coins issuing from the coin guideway being moved into engagement with the abutment by the coin stacking wheel.

5. A coin stacking apparatus comprising:

conveyor means (21) for transporting coins (c) in a horizontal row along a coin guideway (15) leading to a coin stacking position adjacent to a vertically extending coin stacking space; and means for stacking the coins at said coin stacking position into the coin stacking space, said means for stacking the coins comprising a stacking ratchet (24) rotatable about a horizontal axis perpendicular to the direction of said row, said ratchet having a series of teeth formed circumferentially thereon, each of said teeth having a non-sloping side (24A) and a sloping side (24B);

said stacking ratchet (24) being disposed at such a position immediately below the coin stacking space that a downstream part of the ratchet with respect to the direction of transporting coins is within a horizontal range of the coin stacking space and that the remaining upstream part of the ratchet is upstream of said horizontal range;

said ratchet being so disposed that each of the teeth has the non-sloping side (24A) thereof facing the coins being transported toward the coin stacking position and takes a position above said guideway (15) so as to be abutted against by the coins on the guideway, when each of the teeth is at a topmost position of the ratchet;

the arrangement of the teeth of the ratchet and the guideway being such that when a coin being transported abuts against the non-sloping side of each tooth at the topmost position, the ratchet is turned about its horizontal axis so as to cause the tooth at the topmost position to move obliquely downward into the horizontal range of the coin stacking space while causing the following tooth to move obliquely upward to the topmost position and then beyond the topmost position, for lifting a trailing part of the coin above the guideway by means of the sloping side of the following tooth with a leading part of the coin supported on the guideway and for feeding the coin into the coin stacking space with an attitude in which the trailing part is higher than the leading part.

6. The coin stacking apparatus as claimed in claim 5, further comprising drive means for forcibly driving the coin stacking ratchet as required.

7. The coin stacking apparatus as claimed in claim 5, further comprising an abutment disposed contiguous to the coin stacking position and opposite the coin guideway, the coins issuing from the coin guideway being moved into engagement with the abutment by the coin stacking ratchet.

8. The coin stacking apparatus as claimed in claim 5, further comprising coin stabilizer means coacting with the stacking ratchet for stably stacking the coins int he stacking position in stable manner by exerting a downward pressure on the coins during the stacking of some number of coins.

9. The coin stacking apparatus as claimed in claim 8, wherein the coin stabilizer means comprises:

(a) a lever pivotable in a vertical plane;

(b) a stabilizer roll rotatably mounted to the lever; and (c) two-way spring means acting on the lever for exerting a downward pressure on the coins being stacked in the coin stacking position via the stabilizer roll and, when a prescribed number of coins are stacked, for pivoting the lever away from the stack of coins.

* * * * *